United States Patent
Matsuoka et al.

(10) Patent No.: US 11,313,267 B2
(45) Date of Patent: Apr. 26, 2022

(54) PARTICULATE MATTER SENSOR

(71) Applicant: DENSO CORPORATION, Kariya (JP)

(72) Inventors: Mikiyasu Matsuoka, Kariya (JP);
Tomoo Kawase, Kariya (JP); Toshiyuki Ishii, Tokyo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/392,774

(22) Filed: Aug. 3, 2021

(65) Prior Publication Data
US 2021/0363910 A1    Nov. 25, 2021

Related U.S. Application Data

(63) Continuation of application No. PCT/JP2020/003158, filed on Jan. 29, 2020.

(30) Foreign Application Priority Data

Feb. 4, 2019 (JP) .............................. JP2019-018094

(51) Int. Cl.
*F01N 11/00* (2006.01)
*F01N 9/00* (2006.01)

(52) U.S. Cl.
CPC ........... *F01N 11/002* (2013.01); *F01N 9/002* (2013.01); *F01N 2550/04* (2013.01); *F01N 2560/20* (2013.01); *F01N 2900/04* (2013.01)

(58) Field of Classification Search
CPC .. F01N 2560/20; F01N 2560/05; F01N 11/00; F01N 11/002; F01N 9/002; F01N 2550/04
See application file for complete search history.

(56) References Cited

U.S. PATENT DOCUMENTS

| 2012/0031077 A1* | 2/2012 | Aoki ..................... F01N 13/008 60/276 |
| 2012/0103059 A1* | 5/2012 | Kimata .............. G01N 15/0656 73/23.33 |

(Continued)

FOREIGN PATENT DOCUMENTS

| JP | 2012-047722 | 3/2012 |
| JP | 2018096906 A * | 6/2018 |

*Primary Examiner* — Matthew T Largi
(74) *Attorney, Agent, or Firm* — Nixon & Vanderhye P.C.

(57) ABSTRACT

A particulate matter sensor includes a sensor element that includes a measurement member and a heater. An anomaly determiner performs determination that there is a break fault in a signal path of the measurement signal in response to both:
(1) A first determiner, which determines whether a first measurement value of the measurement signal is higher than or equal to a predetermined normal determination threshold while the measurement voltage is applied between the measurement electrodes and the temperature of the measurement member is controlled at a first determination temperature, making a negative determination; and
(2) A second determiner, which performs negative determination while the measurement voltage is applied between the measurement electrodes and the temperature of the measurement member is controlled within a predetermined temperature range that is higher than the first determination temperature and lower than a second determination temperature, making a negative determination.

9 Claims, 16 Drawing Sheets

(56) References Cited

U.S. PATENT DOCUMENTS

| | | | |
|---|---|---|---|
| 2012/0260636 A1* | 10/2012 | Hashida | F01N 11/00 60/276 |
| 2013/0030678 A1* | 1/2013 | Aoki | F01N 9/002 701/113 |
| 2013/0298537 A1* | 11/2013 | Aoki | F02D 41/2474 60/311 |
| 2014/0165979 A1* | 6/2014 | Nishijima | F02D 41/1466 123/672 |
| 2015/0177204 A1 | 6/2015 | Bessen et al. | |
| 2016/0273465 A1* | 9/2016 | Nishijima | F01N 3/101 |
| 2016/0356693 A1* | 12/2016 | Tylutki | G01N 15/0656 |
| 2018/0306087 A1* | 10/2018 | Araki | F01N 3/023 |

* cited by examiner

PARTICULATE MATTER SENSOR

CROSS-REFERENCE TO RELATED APPLICATION

The present application is a bypass continuation application of currently pending international application No. PCT/JP2020/003158 filed on Jan. 29, 2020 designating the United States of America, the entire disclosure of which is incorporated herein by reference.

The present application is based on and claims priority to Japanese Patent Application No. 2019-018094 filed on Feb. 4, 2019, the disclosure of which is incorporated herein by reference.

TECHNICAL FIELD

The present disclosure relates to particulate matter sensors for measuring particulate matter contained in an exhaust gas from an internal combustion engine.

BACKGROUND

An exhaust gas cleaning system, which includes a particulate matter filter, aims to trap particulate matter (PM) contained in an exhaust gas from, for example, a vehicular engine. Such an exhaust gas cleaning system includes a PM sensor for measuring the particulate matter leaking from a particulate filter if the particulate filter is, for example, broken.

SUMMARY

A particulate matter sensor of an exemplary aspect of the present disclosure includers an anomaly determiner. The anomaly determiner includes a first determiner.

The first determiner is configured to instruct a temperature controller to control a temperature of a measurement member to be at a first determination temperature, instruct the measurement controller to apply a measurement voltage between measurement electrodes, and determine whether a first measurement value of a measurement signal is higher than or equal to a predetermined normal determination threshold while the measurement voltage is applied between the measurement electrodes.

The anomaly determiner includes a second determiner.

The second determiner is configured to instruct the temperature controller to control the temperature of the measurement member to be within a predetermined temperature range that is higher than the first determination temperature and lower than a second determination temperature, instruct the measurement controller to apply the measurement voltage between the measurement electrodes, and determine whether one or more second measurement values of the measurement signal are higher than or equal to the predetermined normal determination threshold while the measurement voltage is applied between the measurement electrodes.

The anomaly determiner is configured to perform, as the anomaly determination, determination that there is a break fault in the signal path of the measurement signal in response to both (1) The first determiner determining that the first measurement value is lower than the predetermined normal determination threshold (2) The second determiner determining that the one or more second measurement values are lower than the predetermined normal determination threshold

BRIEF DESCRIPTION OF THE DRAWINGS

The object described above, other objects, features, and advantages of the present disclosure will become apparent from the following description of embodiments with reference to the accompanying drawings in which.

DESCRIPTION OF EMBODIMENTS

Figure 1:
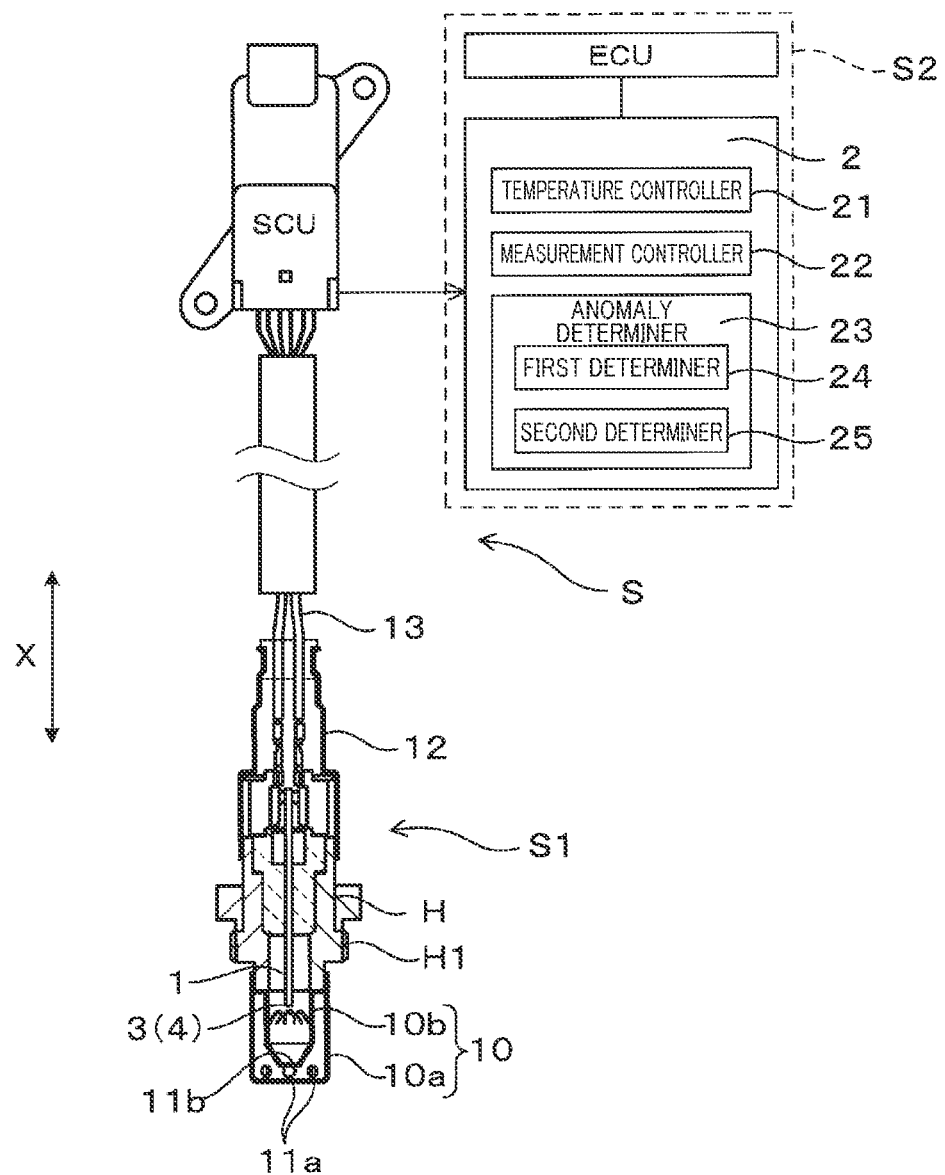
FIG. 1 is an overall structural view of a particulate matter sensor according to the first embodiment.

Emission control has been tightened in recent years. From this requirement, more speedy detection of a fault in an exhaust gas cleaning system is required. In particular, anormal operations of a PM sensor may result in an erroneous measurement of the particulate matter. For this reason, it is necessary to determine whether the PM sensor has malfunctioned. Output anomalies of the PM sensor include a circuit malfunction. A break fault in signal lines, such as lead wires or external connection wires, connected to a measuring member of the PM sensor may not obtain an originally designed level of an output signal outputted from the PM sensor, making it difficult to measure the particulate matter.

Japanese Patent Application Publication No. 2015-520387 discloses a method of monitoring functions of a sensor, which includes a heater and at least two measurement electrodes mounted on an insulating substrate, for measuring particles. Specifically, the method disclosed in the patent publication performs (1) A first measurement of a first current-voltage property between the two measurement electrodes at a first temperature of the sensor (2) A second measurement of a second current-voltage property between the two measurement electrodes at a second temperature of the sensor lower than the first temperature (3) Determination of whether an absolute difference between a first current value measured as the first current-voltage property and a second current value measured as the second current-voltage property has reached a predetermined threshold value (4) Determination that there is a defect or fault in the sensor upon determination that the absolute difference between the first and second current values has not reached the predetermined threshold value Using the absolute difference between the first current value at the first temperature and the second current value at the second temperature lower than the first temperature enables a shunt current to be removed as an offset current from the absolute difference between the first current value and the second current value.

The patent publication utilizes one of characteristics of the sensor under the assumption that the sensor is operating normally; the one of the characteristics is that a change between the first current value and the second current value results from a reduction in electric conductivity between the two electrodes due to a temperature drop from the first temperature of the sensor to the second temperature thereof.

When the output current level of the sensor has decreased due to age-related deterioration, the patent publication, which performs a fault determination of the sensor using the absolute difference between the first and second current values, reduces adverse effects of the change in the output current level of the sensor due to age-related deterioration.

Unfortunately, changing the temperature of the sensor from a higher value to a lower value may result in erroneous fault determination of the sensor because of a small output-current change of the sensor caused by the temperature change. For avoiding the erroneous fault determination of the sensor, a sufficient difference between the first temperature of the sensor and the second temperature of the sensor is needed.

That is, it is necessary to (1) Heat the sensor to set the first temperature of the sensor to an extremely high value of, for example, 785° C., which is close to a predetermined heat-resistant upper temperature limit (2) Set the second temperature of the sensor to a value of, for example, 635° C., which is lower than the first temperature by a certain level of temperature selected from the temperature range from 120° C. to 180° C. inclusive This requires not only accurate temperature control of the sensor, but also repeated voltage applications to the sensor at its high temperatures. This may cause a concern that durability of the sensor may be reduced due to its thermal deteriorations.

The present disclosure aims to provide more reliable particulate matter sensors, each of which is capable of accurately determining whether there is a break fault in one or more signal wirings connected to a measuring member of the corresponding sensor while preventing reduction in the durability of the corresponding sensor due to its thermal deteriorations.

One aspect of the present disclosure is a particulate matter sensor that includes a sensor element for measuring particulate matter contained in a measurement gas and a sensor control unit.

The sensor element includes an insulating base having a surface, a measurement member that includes a pair of measurement electrodes located to the surface of the insulating base, and a heater for heating the measurement member.

The sensor control unit includes a temperature controller configured to control energization of the heater to thereby maintain a temperature of the measurement member at a predetermined temperature. The sensor control unit includes a measurement controller configured to apply a voltage between the measurement electrodes to thereby obtain a measurement signal based on a resistance value across the measurement electrodes. The sensor control unit includes an anomaly determiner configured to perform anomaly determination of whether there is an anomaly in the sensor element based on the measurement signal obtained by the measurement controller and sent from the measurement controller via a signal path.

The anomaly determiner includes a first determiner.

The first determiner is configured to instruct the temperature controller to control a temperature of the measurement member to be at a first determination temperature, instruct the measurement controller to apply a measurement voltage between the measurement electrodes, and determine whether a first measurement value of the measurement signal is higher than or equal to a predetermined normal determination threshold while the measurement voltage is applied between the measurement electrodes.

The anomaly determiner includes a second determiner.

The second determiner is configured to instruct the temperature controller to control the temperature of the measurement member to be within a predetermined temperature range that is higher than the first determination temperature and lower than a second determination temperature, instruct the measurement controller to apply the measurement voltage between the measurement electrodes, and determine whether one or more second measurement values of the measurement signal are higher than or equal to the predetermined normal determination threshold while the measurement voltage is applied between the measurement electrodes.

The anomaly determiner is configured to perform, as the anomaly determination, determination that there is a break fault in the signal path of the measurement signal in response to both (1) The first determiner determining that the first measurement value is lower than the predetermined normal determination threshold (2) The second determiner determining that the one or more second measurement values are lower than the predetermined normal determination threshold The temperature controller of the sensor control unit installed in the particulate matter sensor controls the temperature of the measurement member at the first determination temperature or the second determination temperature. The anomaly determiner of the sensor control unit is configured to compare the first measurement value of the measurement signal at the first determination temperature or the one or more second measurement values at the second determination temperature with the predetermined normal determination threshold.

The normal determination threshold is set to, for example, a value that enables whether there is an anomaly in the sensor element to be determined at the first determination temperature if the measurement member of the sensor element is in proper working order. If it is determined that the measurement member of the sensor element is in proper working order by the first determiner, it is possible to terminate anomaly determination of the sensor element without raising the temperature of the measurement member toward the second determination temperature.

Otherwise, if it is determined that the measurement member of the sensor element is not in proper working order by the first determiner, it is possible for the second determiner to determine whether there is an anomaly in the sensor element while the temperature of the measurement member is rising toward the second determination temperature.

As described above, stepwise raising of the temperature of the sensor element results in anomaly determination being transferred from the first determiner to the second determiner only if the sensor element has a lower output level due to age deterioration. Because the sensor element is determined to be in proper working order by the first determiner if the sensor element has no lower output level due to age deterioration, there is no need of transferring anomaly determination from the first determiner to the second determiner. In particular, the second determiner is configured to gradually raise the temperature of the measurement member toward the second determination temperature. This configuration results in a lower risk of overtemperature of the measurement member.

The above particulate matter sensor therefore makes it possible to determine whether the sensor element is in proper working order more accurately while reducing thermal deteriorations and energy loss of the sensor element.

As described above, the one aspect of the present disclosure provides the particulate matter sensor, which is capable of detecting a break fault in one or more signal lines connected to the measurement member while preventing reduction in the durability of the particulate matter sensor due to its thermal deteriorations. This therefore results in the particulate matter sensor provided by the one aspect of the present disclosure having a higher reliability.

Parenthetic reference characters or numerals are assigned to respective elements in some paragraphs of the specification and claims. Each parenthetic reference character or numeral of an element represents only an example of a correspondence relationship between the element and a specific means described in the embodiments described later, and therefore, the parenthetic reference characters or numerals do not limit the technical scope of the present disclosure.

The following describes particulate matter sensors according to exemplary embodiments of the present disclosure with reference to FIGS. 1 to 14.

First Embodiment

Referring to FIGS. 1 to 4, a particulate matter sensor S includes a sensor body S1 that includes a sensor element 1 configured to measure particulate matter contained in a measurement gas. The particulate matter sensor S includes a sensor control unit S2 that includes a sensor control unit (SCU) 2.

The sensor element 1 includes an insulating base 11, a measurement member 3, and a heater 4. The measurement member 3 includes a pair of measurement electrodes 31 and 32 exposed on the surface of the insulating base 11. The heater 4 is configured to heat the measurement member 3.

Figure 5:
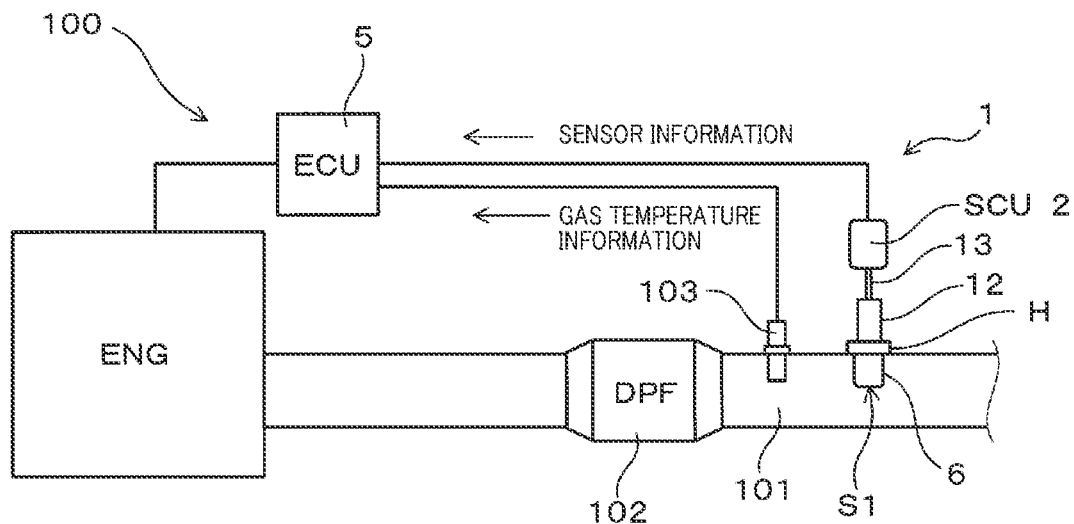
FIG. 5 is an overall structural view of an exhaust gas cleaning system including the particulate matter sensor according to the first embodiment.

For example, the particulate matter sensor S set forth above includes, as illustrated in FIG. 5, can be applied to an exhaust gas cleaning system installed in a vehicular diesel engine, referred to simply as an engine, ENG; the engine ENG serves as an internal combustion engine. The sensor body S1 can be mounted to an exhaust pipe 101 of the engine ENG. A diesel particulate filter (DPF) 102 is mounted on an inner wall of the exhaust pipe 101, and is located upstream of the sensor body S1. The SCU 2 instructs the sensor element 1 of the sensor body S1 to measure particulate matter leaking from the DPF 102.

The SCU 2 includes a temperature controller 21, a measurement controller 22, and an anomaly determiner 23. The SCU 2 is connected to a vehicular electronic control unit (ECU) 5; the SCU 2 and ECU 5 constitute the sensor control unit S2.

The temperature controller 21 is configured to control energization of the heater 4 to thereby maintain the temperature of the measurement member 3 within a predetermined temperature range.

The measurement controller 22 is configured to apply a predetermined voltage between the measurement electrodes 31 and 32 to thereby obtain a measurement signal based on a resistance value across the measurement electrodes 31 and 32. The anomaly determiner 23 is configured to perform anomaly determination of the sensor element 1 based on the measurement signal obtained by the measurement controller 22.

The anomaly determiner 23 includes a first determiner 24 and a second determiner 25. The anomaly determiner 23 is configured to determine that there is a break fault in a signal path for the measurement signal upon the first determiner 24 making a negative determination and the second determiner 25 making a negative determination at a second determination temperature T2.

Specifically, the temperature controller 21 performs a first temperature control task that controls the temperature of the measurement member 3 at a first determination temperature T1. The measurement controller 22 performs a first voltage application task that applies a predetermined measurement voltage between the measurement electrodes 31 and 32.

While the temperature controller 21 is performing the first temperature control task and the measurement controller 22 is performing the first voltage application task, the first determiner 24 is configured to determine whether measurement values of the measurement signal obtained thereby are each larger than or equal to a predetermined normal determination threshold Ith.

The temperature controller 21 performs a second temperature control task that controls the temperature of the measurement member 3 within a predetermined temperature range defined from the first determination temperature T1 exclusive to the second determination temperature T2 inclusive. The measurement controller 22 performs a second voltage application task that applies the predetermined measurement voltage between the measurement electrodes 31 and 32. While the temperature controller 21 is performing the second temperature control task and the measurement controller 22 is performing the second voltage application task, the second determiner 25 is configured to determine whether measurement values of the measurement signal obtained thereby are each larger than or equal to the predetermined normal determination threshold Ith.

For example, the second determiner 25 is preferably configured to
(1) Obtain measurement values of the measurement signal while the temperature of the measurement member 3 is rising from the first determination temperature T1 to the second determination temperature T2
(2) Determine whether each of the obtained measurement values of the measurement signal is higher than or equal to the predetermined normal determination threshold Ith
(3) Determine that there is a break fault in the signal path upon continuous determination that the obtained measurement values of the measurement signal are each lower than the predetermined normal determination threshold Ith The anomaly determiner 23 is additionally configured to determine that the signal path is in proper working order upon
(i) The first determiner 24 performing affirmative determination or
(ii) The determination of whether at least one of measurement values of the measurement signal obtained thereby is larger than or equal to the predetermined normal determination threshold Ith while the temperature of the measurement member 3 is rising from the first determination temperature T1 to the second determination temperature T2 being affirmative The temperature controller 21 is preferably configured to set the rate of temperature rise in the measurement member 3 from the first determination temperature T1 to the second determination temperature T2 to be lower than or equal to 3° C. per 0.1 seconds (3° C./0.1 seconds). This setting prevents the measurement member 3 from being in an overtemperature state due to delay of the temperature control.

The sensor control unit S2 can have a regeneration control function of instructing the temperature controller 21 to control the temperature of the measurement member 3 within a predetermined regeneration temperature range that enables the particulate matter to be burned. When the sensor control unit S2 performs the regeneration control function, the first determination temperature T1 used by the first determiner 24 is preferably set to be within the regeneration temperature range.

The second determination temperature T2 used by the second determiner 25 is preferably set; this setting enables a lowest limit value of the measurement signal to be larger than or equal to the normal determination threshold Ith; the lowest limit value of the measurement signal is estimated due to (i) an estimated individual variation range in quality of the measurement member 3, or (ii) an age-related deterioration in electric conductivity of the measurement member 3.

Next, the following describes the detailed configuration of the particulate matter sensor S.

Figure 2:
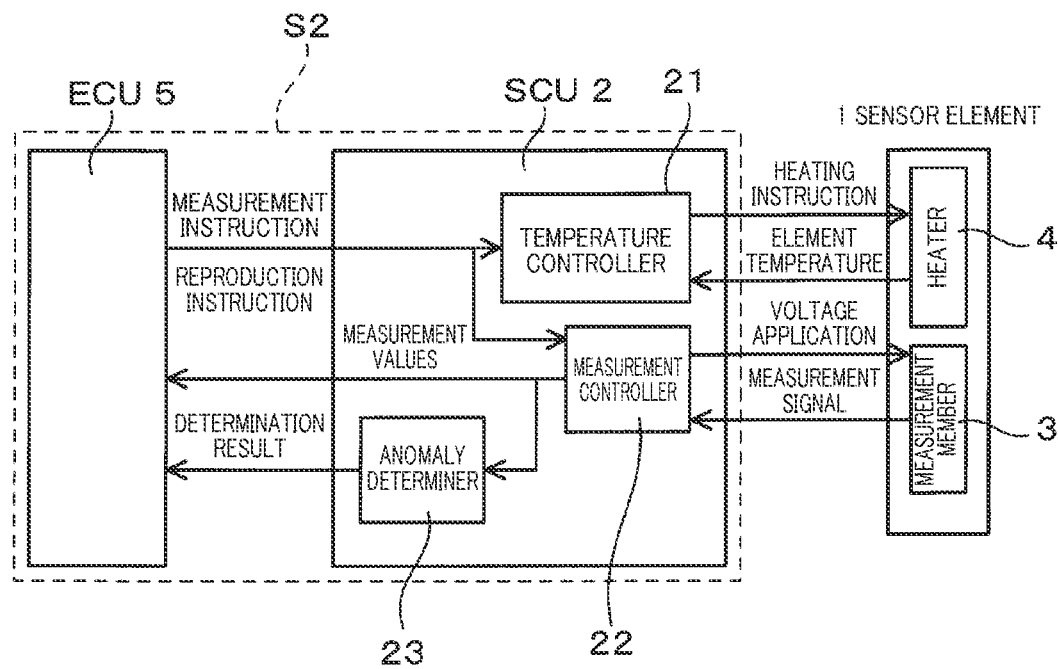
FIG. 2 is a block diagram schematically illustrating sensor control carried out by a sensor control unit of the particulate matter sensor according to the first embodiment.

Referring to FIGS. 1 and 2, the particulate matter sensor S includes the sensor body S1 comprised of the sensor element 1, and the sensor control unit S2. The sensor control unit S2 includes the ECU 5 and the SCU 2 connected to the sensor body S1.

The sensor body S1 includes a cylindrical tubular housing H. The sensor element 1 is coaxially installed in the tubular housing H; the sensor element 1 is disposed to face the inner peripheral wall of the tubular housing H. The sensor body S1 includes an attachment thread member H1 mounted on the outer periphery of the tubular housing H.

The tubular housing H has opposing first and second ends, each of which has an opening. The sensor body S1 includes a container-like element cover 10, and a cylindrical tubular atmosphere cover 12. The element cover 10 is fixedly mounted to the first end of the housing H, and the atmosphere cover 12 is fixedly mounted to the second end of the housing H.

The specification defines that the vertical direction in FIG. 1 corresponds to an axial direction X of the sensor element 1, a lower side of the axial direction X corresponds to a first-end side of the sensor element 1, and an upper side of the axial direction X corresponds to a second-end side of the sensor element 1.

For example, as illustrated in FIG. 5, the sensor element 1 is mounted in the exhaust pipe 101 with a second end portion of the sensor element 1 exposed outwardly therefrom. The atmosphere cover 12, which has opposing first and second ends, is arranged to cover the second end portion of the sensor element 1. The sensor body S1 includes lead wires 13 drawn out of the measurement member 3 through the second end of the atmosphere cover 12, so that the sensor element 1 and the SCU 2 are electrically connected to each other through the lead wires 13.

When receiving a measurement instruction for anomaly determination or a regeneration instruction sent from the ECU 5, the SCU 2 is configured to instruct the temperature controller 21 to perform at least one of
(1) Outputting, to the heater 4 of the sensor element 1, a command that causes the heater 4 to heat the measurement member 3 to thereby adjust the temperature of the measurement member 3 to a selected temperature value or
(2) Stopping the heater 4 from heating the measurement member 3

The measurement controller 22 of the SCU 2 is configured to apply the measurement voltage to the measurement member 3 of the sensor element 1, so that measurement values of the measurement signal from the measurement member 3 are transmitted to the ECU 5. The measurement values of the measurement signal from the measurement member 3 are also transmitted to the anomaly determiner 23, so that the above determination task based on the measurement values of the measurement signal is carried out by the anomaly determiner 23. Then, a result of the determination task carried out by the anomaly determiner 23 is transmitted to the ECU 5.

The ECU 5 receives sensor information, which includes the measurement values of the measurement signal and the result of the determination task, and also receives, as gas temperature information, information about the temperature of the exhaust gas transmitted from a temperature sensor 103 disposed downstream of the DPF 102 (see, for example, FIG. 5). Then, the ECU 5 is configured to control, based on the sensor information and the gas information, 1. Control how the DPF 12 traps the particulate matter
2. Control, through the SCU 2, how to activate the particulate matter sensor S How the above control tasks are carried out by the above controllers will be described in detail later.

Figure 3:
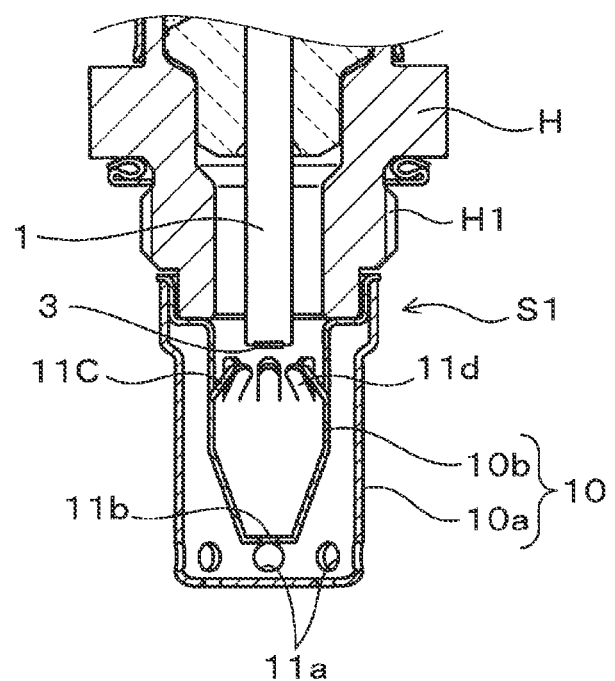
FIG. 3 is an enlarged cross-sectional view of a selected portion of a sensor body of the particulate matter sensor according to the first embodiment.
Figure 4:
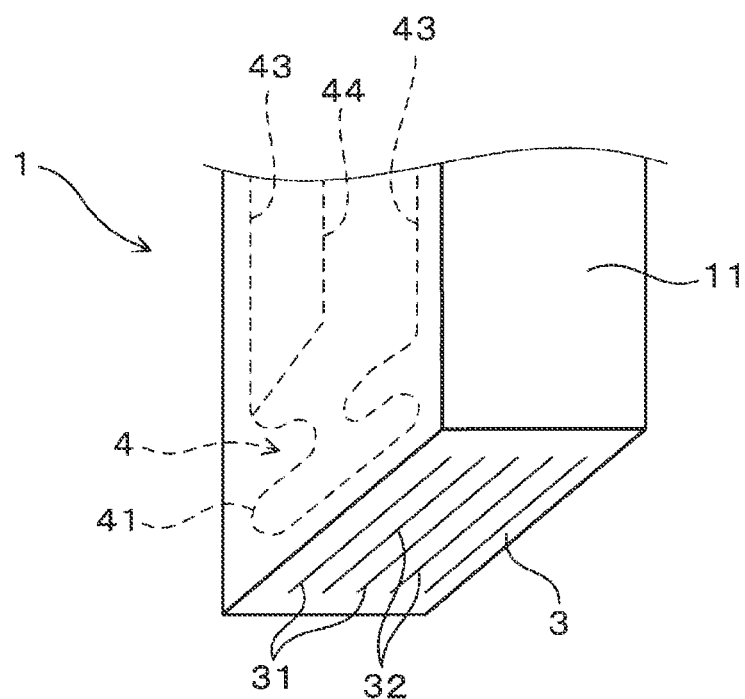
FIG. 4 is an enlarged perspective view of a selected portion of a sensor element of the particulate matter sensor according to the first embodiment.

FIGS. 3 and 4 illustrates an example of the configuration of the sensor element 1.

Specifically, the sensor element 1 has an elongated rectangular-parallelepiped shape extending in a direction corresponding to the axial direction X of the sensor body S1. The sensor element 1 has opposing first and second ends, and the measurement member 3 is mounted to a surface of the first end of the sensor element 1. The measurement member 3 measures an amount of the particulate matter contained in the exhaust gas discharged from the engine ENG.

The first end of the sensor element 1 projects from the opening of the first end of the housing H in the axial direction X, so that the first end of the sensor element 1 is disposed in the element cover 10 mounted to the first end of the housing H. The element cover 10 is arranged to cover the outer portion of the first end of the sensor element 1 to thereby protect the sensor element 1 against poisoning materials and/or condensed water.

The element cover 10 is designed to have, for example, a double-container shape with opposing first and second ends, a surface of the second end of which is an opening. Specifically, the element cover 10 is comprised of an outer cover 10a and an inner cover 10b that are coaxially arranged.

The outer cover 10a has opposing first and second end portions, and also has gas through holes 11a formed through a cylindrical tubular side of the first end portion thereof. The gas through holes 11a enable parts of the exhaust gas to be introduced therethrough into the outer cover 10a from the exhaust gas pipe 101, or the introduced pasts of the exhaust gas to be discharged therethrough from the outer cover 10a.

The inner cover 10b has opposing first and second end portions, and also has a gas through hole 11b formed through an end surface of the first end portion thereof. The inner cover 10b also has gas through holes 11c formed through a cylindrical tubular side of the second end portion thereof. Guide members 11d are provided in the respective gas through holes 11c. Each guide member 11d is inclined to extend toward the inside of the inner cover 10b. Specifically, an extending end of each guide member 11d is directed toward the measurement member 3 of the sensor element 1.

The sensor element 1 is designed as, for example, a stack sensor element having a stack configuration. Specifically, the insulating base 11 has a flat rectangular-parallelepiped shape, and has opposing first and second end surfaces. The measurement member 3 includes the pair of measurement electrodes 31 and 32, and each of the measurement electrodes 31 and 32 includes a plurality of linear electrode portions exposed on the first end surface of the insulating base 11. The linear electrode portions of the measurement electrode 31 have a predetermined first polarity, and the linear electrode portions of the measurement electrode 32 have a predetermined second polarity that is opposite to the first polarity. The linear electrode portions of the measurement electrode 31 and the linear electrode portions of the measurement electrode 32 are alternately arranged on the first end surface of the insulating base 11. This arrangement causes a plurality of electrode pairs to be created on the first end surface of the insulating base 11; the electrodes of each pair respectively have the different first and second polarities.

For example, the insulating base 11 is comprised of a plurality of insulating sheets, and each of the measurement electrodes 31 and 32 is comprised of a plurality of electrode films. That is, the insulating sheets and the electrode films constituting one of the measurement electrodes 31 and 32 are alternately stacked to constitute a stack assembly as the measurement member 3. For example, the stacked insulating sheets and electrode films have been burned to be integrated with each other as a one stack assembly that constitutes the measurement member 3.

At least edges of the respective stacked electrode films of the measurement electrode 31 are exposed on the first end surface of the insulating base 11 to constitute the linear electrode portions of the measurement electrode 31. Similarly, at least edges of respective stacked electrode films of the measurement electrode 32 are exposed on the first end surface of the insulating base 11 to constitute the linear electrode portions of the measurement electrode 32. The insulating base 11 can be composed of, for example, an insulating ceramics material, such as alumina.

Unillustrated lead members, which are connected to the measurement electrodes 31 and 31, are embedded in the insulating base 11. The lead members are drawn out from the end surface of the second end portion of the sensor element 1, and respectively connected to selected wires in the lead wires 13. That is, the lead members are connected to the measurement controller 22 of the SCU 2 through the lead wires 13 (see FIG. 1).

The heater 41 is comprised of a heater electrode 41, a pair of lead members 42 and 43, and a measurement lead member 44 that are embedded in the insulating base 11. The heater electrode 41 serves as a heat generator of the heater 34, and is disposed to be adjacent to the first end surface of the insulating base 11 on which the linear electrode portions of the measurement electrodes 31 and 32 are exposed.

The pair of lead members 42 and 43 are used to energize the heater electrode 41.

These lead members 42, 43, and 44 are drawn out from the end surface of the second end portion of the sensor element 1, and respectively connected to selected wires in the lead wires 13. That is, the lead members 42, 43, and 44 are connected to the temperature controller 21 of the SCU 2 through the lead wires 13 (see FIG. 1).

The temperature controller 21 includes, for example, a pulse width modulator for controlling the width of each pulse included in a heater drive pulse signal. Specifically, the temperature controller 21 is configured to control a duty cycle, which will be referred to as a heater duty, of the heater drive pulse signal to thereby control an energization amount, i.e., an energization level, of the heater 4.

The temperature controller 21 is additionally configured to measure, based on a resistance value of the heater electrode 41, which will, as necessary, be referred to as a heater resistance, the temperature T of the measurement member 3 of the sensor element 1; the temperature T of the measurement member 3 of the sensor element 1 will, as necessary, be referred to as an element temperature T. For Specifically, the temperature controller 21 includes, for example, a heater resistance measurement circuit, and the heater resistance measurement circuit is configured to measure a current flowing through the heater 4 while applying a predetermined voltage to the heater 4, thus calculating a resistance value of the heater 4 based on the predetermined voltage and the measured current value.

The heater measurement circuit is additionally configured to calculate a resistance value of each of the lead members 42 and 43 using the measurement lead member 44. Then, the heater measurement circuit is configured to subtract the resistance values of the lead members 42 and 43 from the resistance value of the heater 4 to thereby accurately calculate the heater resistance.

Specifically, the temperature controller 21 is configured to control the energization level of the heater 4 to thereby heat the sensor element at a desired temperature during anomaly determination of the particulate matter sensor S and/or during regeneration control of the sensor element 1 required for startup of the engine ENG.

For example, the regeneration control function is carried out preparatory for the start of monitoring of the particulate matter by the measurement controller 22 in response to startup of the engine ENG; the regeneration control function instructs the temperature controller 21 to (1) Heat the measurement member 3 to thereby increase the temperature of the measurement member 3 to a value more than or equal to a temperature range of the particulate matter being burned, such as a value within the range from 600° C. to 800° C. inclusive (2) Burn, using the heated measurement member 3, particles of the particulate matter trapped by the measurement member 3 to thereby remove the trapped particles of the particulate matter, thus restoring the measurement member 3 to its refreshing state from which the trapped particles have been removed Additionally, the temperature controller 21 is configured to perform, during, for example, cold-start of the engine ENG, a water-resistance task of heating the measurement member 3 to thereby increase the temperature of the measurement member 3 to a value lower than the temperature range of the particulate matter being burned, such as a value within the range from 300° C. to 600° C. inclusive. This water-resistance task results in condensed water adhered to the sensor element 1 being removed therefrom.

Figure 6:
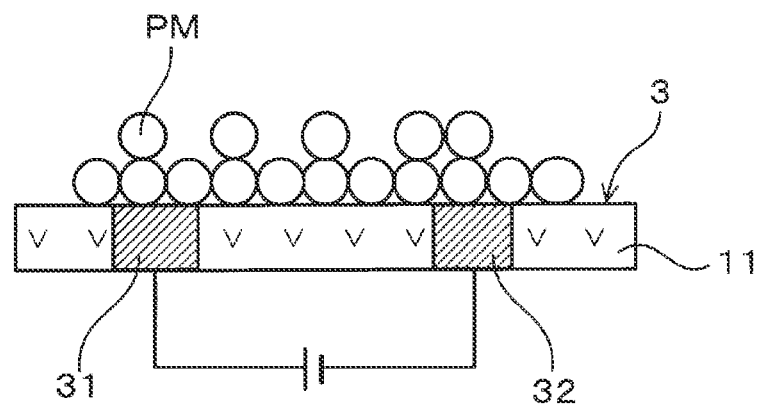
FIG. 6 is a schematic cross-sectional view used to describe operations of the sensor element according to the first embodiment.

Next, the following describes a theory of measuring the particulate matter with reference to a schematic view of FIG. 6.

Each of the linear electrode portions of the measurement electrode 31 is arranged to face at least one adjacent linear electrode portion of the measurement electrode 32 with a predetermined interval therebetween. No voltage is applied between the measurement electrodes 31 and 32 of the measurement member 3 of the sensor element 1 in a measurement start state.

Applying a predetermined voltage between the measurement electrodes 31 and 32 by the measurement controller 22 during a predetermined particulate matter measurement period causes an electric field generated between the measurement electrodes 31 and 32 to attract particles of the particulate matter, resulting in the attracted particles of the particulate matter being gradually accumulated on the first end surface of the insulating base 11. An increase in the accumulated particles of the particulate matter results in the measurement electrodes 31 and 32 being electrically connected to each other. This enables the resistance value across the measurement electrodes 31 and 32 to change depending on the amount of the particulate matter trapped on the first end surface of the insulating base 11. Measuring a sensor current between the measurement electrodes 31 and 32 therefore enables the amount of the particulate matter trapped on the first end surface of the insulating base 11 to be measured in accordance with a previously measured relationship between the level of the sensor current and the amount of the particulate matter trapped on the first end surface of the insulating base 11.

For example, the measurement controller 22 includes a voltage application circuit for applying a predetermined collection voltage between the measurement electrodes 31 and 32. That is, the voltage application circuit is configured to apply the predetermined collection voltage between the measurement electrodes 31 and 32 during the predetermined particulate matter measurement period to thereby electrostatically collect particles of the particulate matter between the measurement electrodes 31 and 32. This enables the measurement controller 22 to measure the sensor current flowing between the measurement electrodes 31 and 32, the measured level of which depends on the collected amount of the particulate matter.

Additionally, the measurement controller 22 is configured to apply the predetermined measurement voltage between the measurement electrodes 31 and 32 under predetermined high-temperature conditions during a predetermined anomaly determination period. This configuration enables a leak current to flow as the sensor current between the measurement electrodes 31 and 32. The measurement voltage for anomaly determination of the sensor element 1 can be set to be identical to or different from the collection voltage for measurement of the particulate matter.

Next, the following describes, in detail, the anomaly determiner 23 of the SCU 2.

Figure 7:
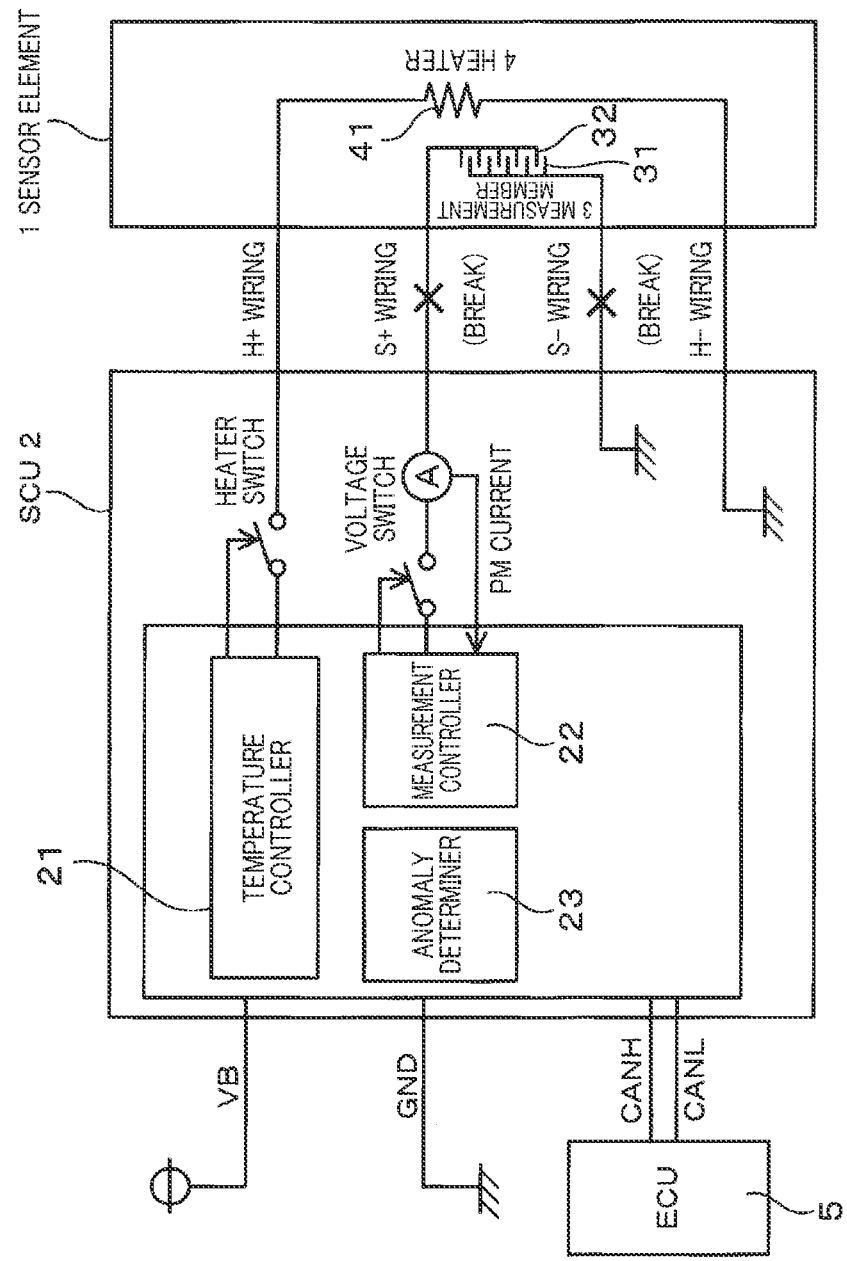
FIG. 7 is a block diagram schematically illustrating anomaly determination carried out by the sensor control unit according to the first embodiment.

As illustrated in FIG. 7, the heater 4 of the sensor element 1 is connected to the temperature controller 21 of the SCU 2 via an H+ wiring on which a heater switch is mounted. The heater 4 of the SCU 2 is also grounded via an H− wiring.

The measurement member 3 is connected to the measurement controller 22 of the SCU 2 via an S+ wiring on which a voltage switch is mounted. The measurement member 3 is also grounded via an S− wiring. A current meter 20 is mounted on the S+ wiring, and the current meter 20 is configured to measure a value of the sensor current flowing through the measurement member 3 during the particulate matter measurement period or the anomaly determination period in response to when the voltage switch is turned on.

As illustrated by x-marks (cross marks) in FIG. 5, a break fault in the S+ wiring or S− wiring serving as the signal path may result in the sensor current being not measured even if the voltage switch is turned on during the particulate matter measurement period. That is, even if the particulate matter leaking from the upstream DPF 102 is accumulated between the measurement electrodes 31 and 32 of the measurement member 3 so that the resistance between the electrodes 31 and 32 is in a low state, the amount of the particulate matter collected by the particulate matter sensor S may be determined to be zero, making it difficult to determine whether the DPF 102 has malfunctioned.

For ensuring the reliability of determination of whether the DPF 102 has malfunctioned, the anomaly determiner 23 includes the first determiner 24 and the second determiner 25, and is configured to periodically diagnose whether a particulate matter measurement function of the particulate matter sensor S is in proper working order or not in proper working order. Specifically, the anomaly determiner 23 is configured to determine whether the particulate matter measurement function of the particulate matter sensor S is in proper working order or not in proper working order in accordance with a level of the sensor current measured by the measurement controller 22.

Sensor signal lines constituting the signal path, which include the S+ wiring and S− wiring, can include the lead wire 13 connecting between the sensor element 1 and the SCU 2, unillustrated lead wires connected to the measurement member 3 inside the sensor element 1, and lead members formed in the SCU 2.

A substantially new normal product, i.e., an early-stage normal product or a normal fresh product, of the sensor element 1, a normal age-deteriorated product of the sensor element 1, and an abnormal product of the sensor element 1 were prepared.

The abnormal product of the sensor element 1 represents that the sensor element 1 in which a break fault has occurred in the signal path.

Figure 8:
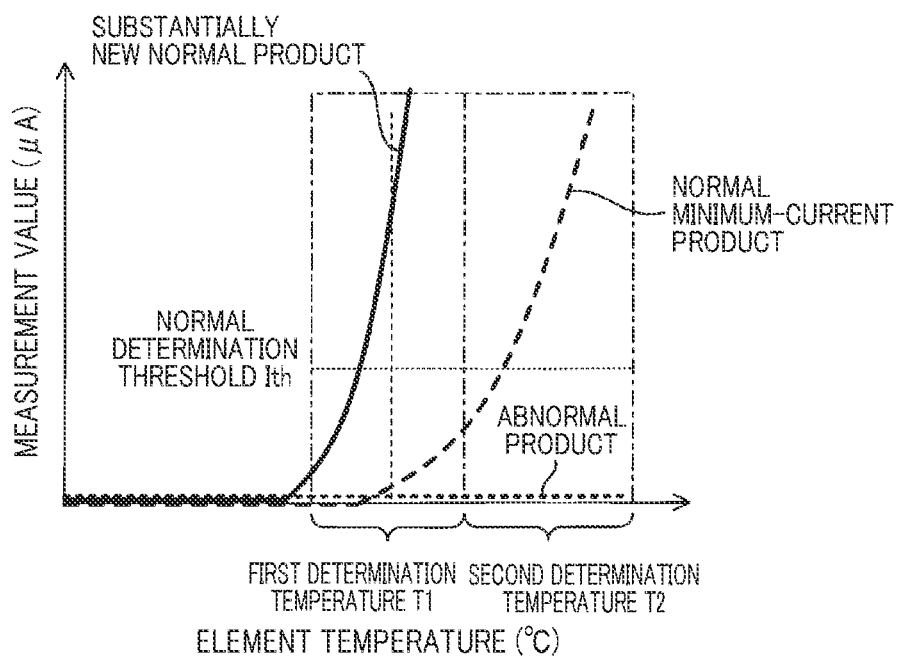
FIG. 8 is a graph illustrating a first relationship between an element temperature of a first normal product of the sensor element and measurement values, and a second relationship between the element temperature of a second normal product of the sensor element and measurement values according to the first embodiment.

FIG. 8 illustrates how the leak current (see "MEASUREMENT VALUE" in FIG. 8) appearing between the measurement electrodes 31 and 32 of each of the substantially new normal product, the normal age-deteriorated product, and the abnormal product.

That is, raising the temperature of the measurement member 3 of each of the substantially new normal product, the normal age-deteriorated product, and the abnormal product while the measurement voltage, such as a value selected from the range from 30 volts to 40 volts inclusive, is applied to the measurement member 3 results in the temperature of the corresponding measurement member 3 having reached a high temperature range. The high temperature range is a temperature range higher than a predetermined regenerative temperature range, such as the range from 650° C. to 800° C. The temperature rising of the measurement member 3 of each of the substantially new normal product, the normal age-deteriorated product, and the abnormal product within the high temperature range results in the leak current appearing between the measurement electrodes 31 and 32 of the corresponding one of the substantially new normal product and the normal age-deteriorated product.

FIG. 8 shows that the measured leak current generated in each of the substantially new normal product and the normal age-deteriorated product exponentially rises with an increase in the temperature of the corresponding measurement member 3, so that the measured leak current generated in each of the substantially new normal product and the normal age-deteriorated product exceeds the predetermined normal determination threshold Ith.

Note that, even for the substantially new normal product, there is an individual variation range in quality. In addition, the level of the leak current appearing between the measurement electrodes 31 and 32 of the measurement member 3 of the normal age-deteriorated product is significantly lower than that of the substantially new normal product, because of an age-related deterioration in electric conductivity of the measurement member 3 (see NORMAL MINIMUM-CURRENT PRODUCT representing the leak-current curve of the normal age-deteriorated product in FIG. 8).

In contrast, as described above, a break fault in the abnormal product results in no measurement signal obtained by the anomaly determiner 23, so that measurement values obtained by the anomaly determiner 23 are each substantially zero independently of the temperature (see ABNORMAL PRODUCT in FIG. 8).

Figure 9:
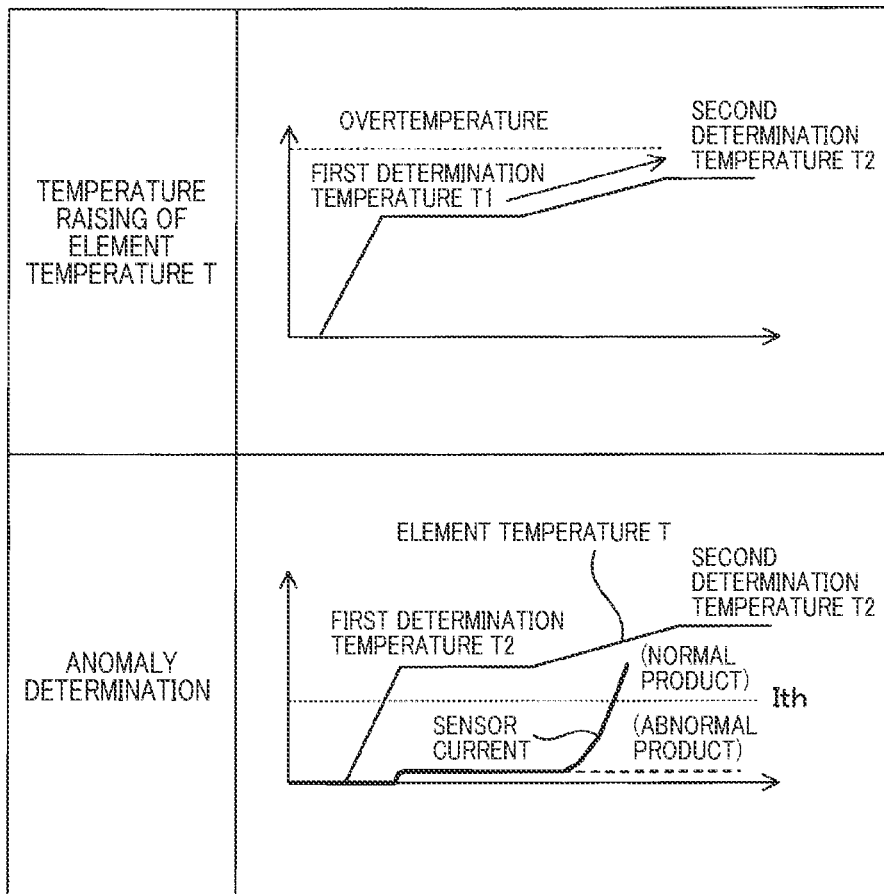
FIG. 9 is a diagram schematically illustrating a temperature rising task and a threshold determination task carried out by a first determiner and a second determiner of an anomaly determiner according to the first embodiment.

As illustrated in a graph located at the bottom of a diagram of FIG. 9, performing the following first and second procedures makes it possible to diagnose whether the sensor signal lines are each in proper working order:

(1) The first procedure determines beforehand a value of the normal determination threshold Ith, which is capable of distinguishing normal products of the sensor element 1 and abnormal products of the sensor element 1, commonly between the first and second determiners 24 and 25.

(2) The second procedure compares measurement values sent from the measurement member 3 with the value of the normal determination threshold Ith while gradually, i.e., stepwisely, raising the element temperature T More specifically, the first determiner 24 is configured to raise the element temperature T up to the first determination temperature T1; the first determination temperature T1 enables, when a normal fresh product of the sensor element 1 has the first determination temperature T1, the sensor current to be measured. If necessary, the second determiner 25 is configured to raise the element temperature T from the first determination temperature T1 up to the second determination temperature T2 that is higher than the first determination temperature T1. A value of the second determination temperature T2 is set to be within a predetermined temperature range lower than an overtemperature range of the sensor element 1; the predetermined temperature range enables, if an age-deteriorated product, which obtains a lowest limit value of the leak current, has a temperature within the predetermined temperature range, the sensor current to be measured.

As illustrated in a graph located at the top of the diagram of FIG. 9, it is preferable to (1) Measure values of the sensor current at appropriately specified respective times while stepwisely raising the element temperature T from the first determination temperature T1 to the second determination temperature T2

(2) Perform anomaly diagnosis of the sensor element 1 in accordance withe each of the measured values of the sensor current If a measurement value of the sensor current has reached the normal determination threshold Ith, it is possible to terminate the anomaly diagnosis of the sensor element 1. This makes it possible to diagnose the sensor element 1 with minimum power consumption while preventing the element temperature T from rising than required, and to decelerate thermal deterioration of the sensor element 1.

Figure 10:
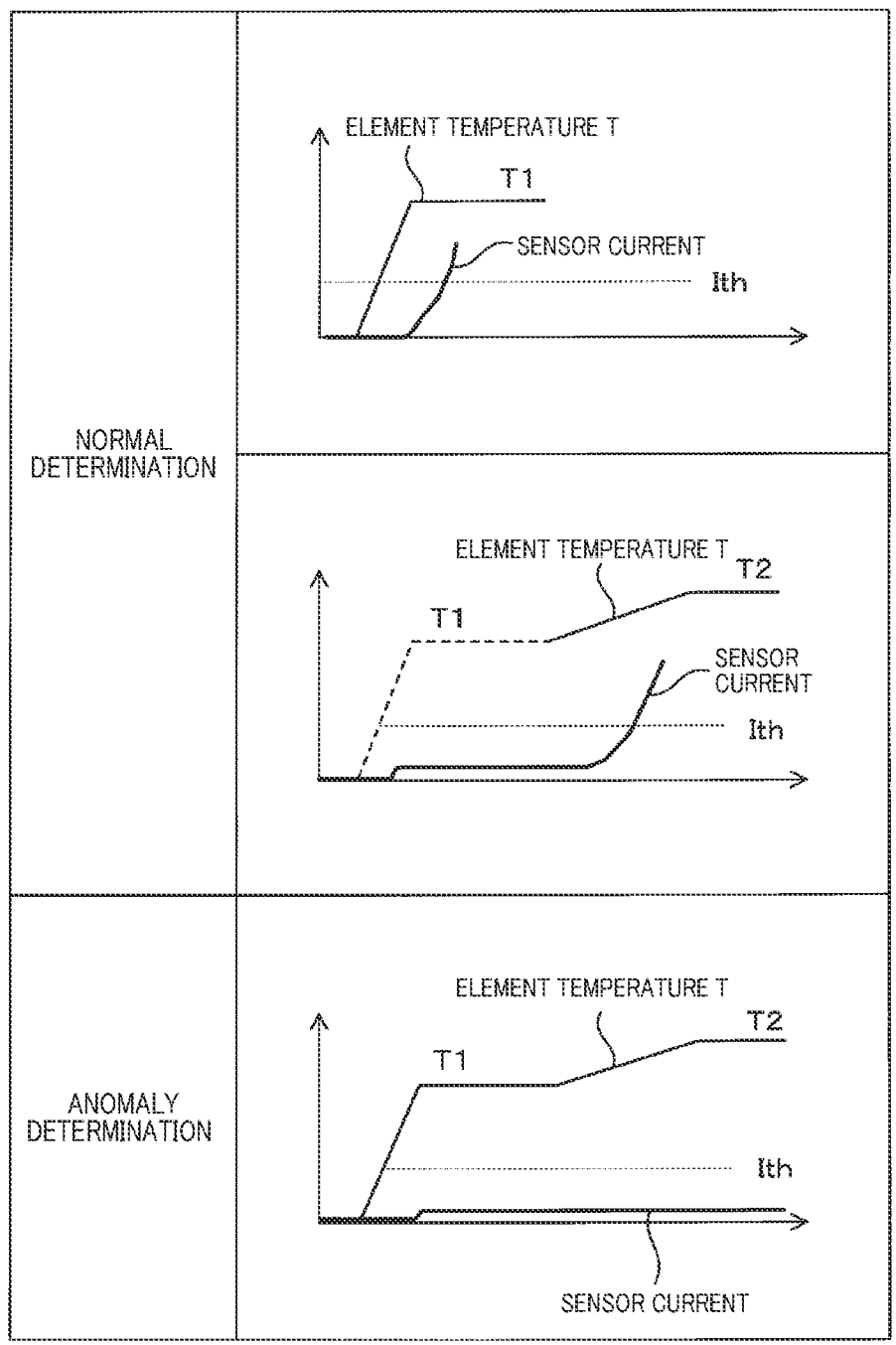
FIG. 10 is a diagram schematically illustrating a normal determination task and an anomaly determination task carried out by the first determiner and the second determiner of the anomaly determiner according to the first embodiment.

That is, as illustrated in a graph located at the top of a diagram of FIG. 10, for a normal fresh product of the sensor element 1, the first determiner 24 raises the element temperature T up to the first determination temperature T1, so that, after the element temperature T reaching the first determination temperature T1, measurement values of the measurement signal, i.e., sensor current, exceed the normal determination threshold Ith, making it possible for the first determiner 24 to determine that the signal path is in proper working order.

As illustrated in a graph located at the middle of the diagram of FIG. 10, even for a normal minimum-current product of the sensor element 1, the second determiner 25 raises the element temperature T from the first determination temperature T1 to the second determination temperature T2 higher than the first determination temperature T1, so that, while the element temperature T rising from the first determination temperature T1 to the second determination temperature T2, measurement values of the measurement signal, i.e., sensor current, exceed the normal determination threshold Ith, making it possible for the second determiner 25 to determine that the signal path is in proper working order.

In contrast, as illustrated in a graph located at the bottom of the diagram of FIG. 10, for an abnormal product of the sensor element 1, neither the first determiner 24 nor the second determiner 25 determines that the signal path is in proper working order. That is, the signal path is determined to be not in proper working order.

The normal determination threshold Ith is specifically set to a current value that reliably separates measurement values of the sensor current measured from each abnormal product of the sensor element 1 in which a break fault has occurred in the signal path thereof from measurement values of the sensor current measured from each normal product of the sensor element 1. The sensor current measured from each abnormal product of the sensor element 1 may include an individual circuit-error variation. The normal products of the sensor element 1 includes normal fresh products and normal minimum-current products.

Preferably, the normal determination threshold Ith is set to a value, such as a value not less than 1.0 μA, that is sufficiently larger than an estimated individual circuit-error variation of, for example, 0.5 μA.

The first determination temperature T1 used by the first determiner 24 is specially set to be within a predetermined temperature range from a predetermined lower limit to a predetermined upper limit inclusive. The lower limit is set to be larger than or equal to a temperature at which the leak current appears as the sensor current in a normal fresh product of the sensor element 1, and the upper limit is set such that, if the temperature of the measurement member 3 is maintained to be lower than the upper limit, it is possible to prevent thermal deterioration of the sensor element 1.

For example, the lower limit of the temperature range is set to a value at which an insulating resistance between the measurement electrodes 31 and 32 of the measurement member 3 is lower than or equal to a predetermined resistance value, such as 20 MΩ while a voltage of 35 V is applied between the measurement electrodes 31 and 32. For example, the upper limit of the temperature range is set to a value corresponding to the maximum temperature at which the leak current can appear between the measurement electrodes 31 and 32 of the measurement member 3 in consideration of an individual variation range in quality between normal products of the sensor element 1 as long as the value of the upper limit is lower than a temperature rise limit. The temperature rise limit represents a temperature such that, if the temperature of the measurement member 3 is maintained to be lower than the temperature, (i) the deposition of ashes and (ii) the evaporation of platinum making up the measurement electrodes 31 and 32 are prevented.

Preferably, the temperature range for the first determination temperature T1 used by the first determiner 24 is set to a relatively low temperature range, such as a range from 700° C. to 750° C., as long as, even if the element temperature T of each normal fresh product of the sensor element 1 is within the relatively low temperature range, the sensor current can be measured. This results in reduction of energy loss.

The second determination temperature T2 used by the second determiner 25 is specially set to be higher than the first determination temperature T1 and to be within a predetermined temperature range. The predetermined temperature range for the second determination temperature T2 is determined such that, if the temperature of each of normal minimum-current products of the sensor element 1, in which the sensor current is hard to appear due to its aged deterioration, is within the predetermined temperature range, an estimated lowest limit of the measurement signal, i.e., sensor current, exceeds the normal determination threshold Ith.

Preferably, a lower limit of the predetermined temperature range for the second determination temperature T2 is set to a value in consideration of sensor-current decrease at high gas-flow rate, which enables, even if the element temperature T is set to the value of the lower limit, a sufficient level of the sensor current to be reliably measured. The sufficient level of the sensor current is reliably unburied in an individual temperature-measurement variation. Additionally, an upper limit of the temperature range is set to the temperature rise limit. The temperature rise limit represents the temperature such that, if the temperature of the measurement member 3 is maintained to be lower than the temperature, (i) the deposition of ashes and (ii) the evaporation of platinum making up the measurement electrodes 31 and 32 are prevented.

Preferably, the temperature range for the second determination temperature T2 used by the second determiner 25 is set to a range from 750° C. to 800° C. that is lower than the temperature rise limit. This makes it possible to perform more accurate diagnosis of the sensor element 1 while preventing overtemperature of the measurement member of the sensor element 1.

The anomaly diagnosis of the sensor element 1 carried out by the anomaly determiner 23 is preferably carried out during regeneration control of the sensor element 1 that is performed at start-up of the engine ENG. In this case, the first determination temperature T1 used by the first determiner 24 is set to be within the regeneration temperature range of the sensor element 1. Preferably, the first determination temperature T1 is set to a target temperature for the regeneration control of the sensor element 1, making it possible for the anomaly determiner 23 to efficiently perform the above temperature rise control.

Figure 11:
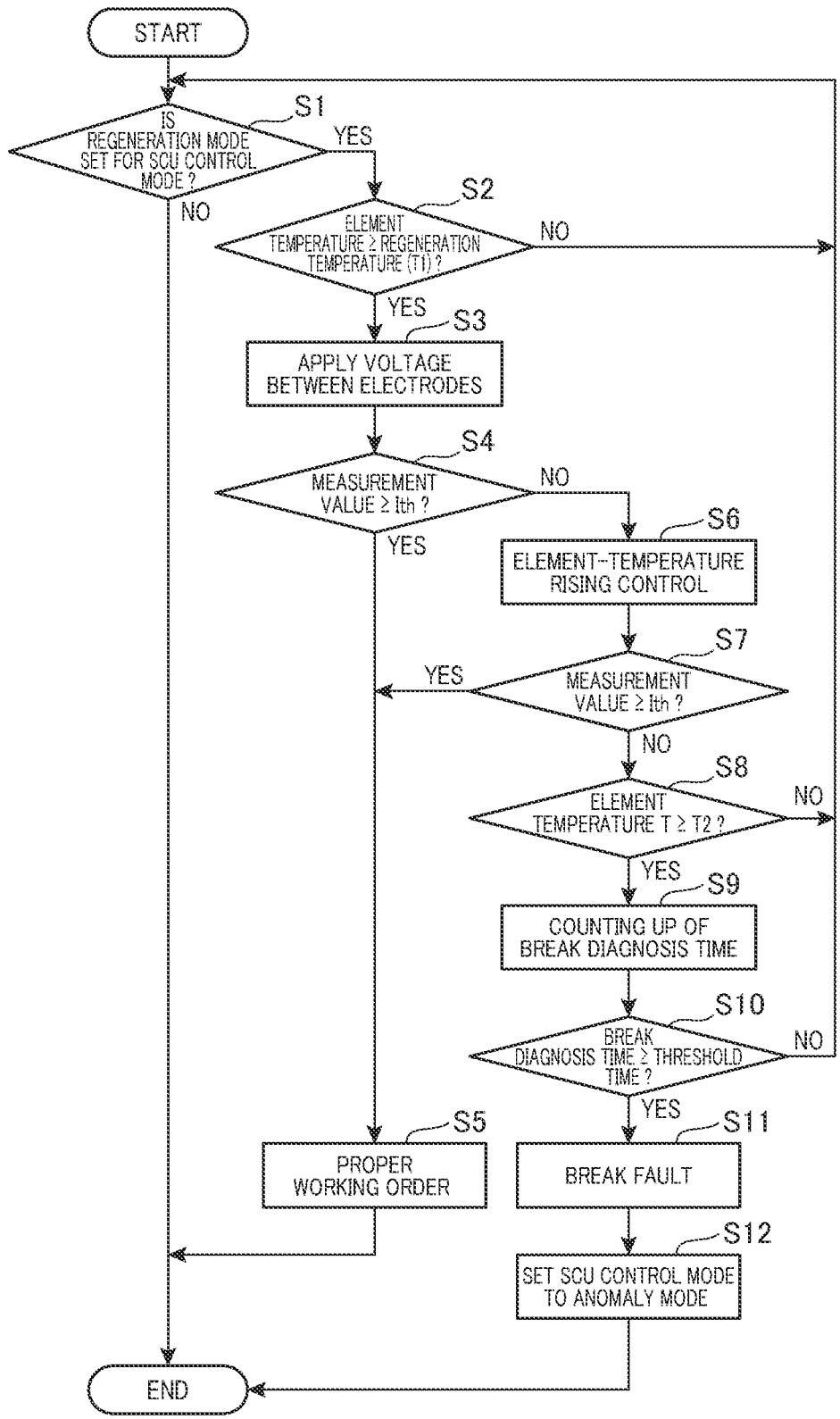
FIG. 11 is a flowchart illustrating an anomaly determination routine according to the first embodiment.
Figure 12A:
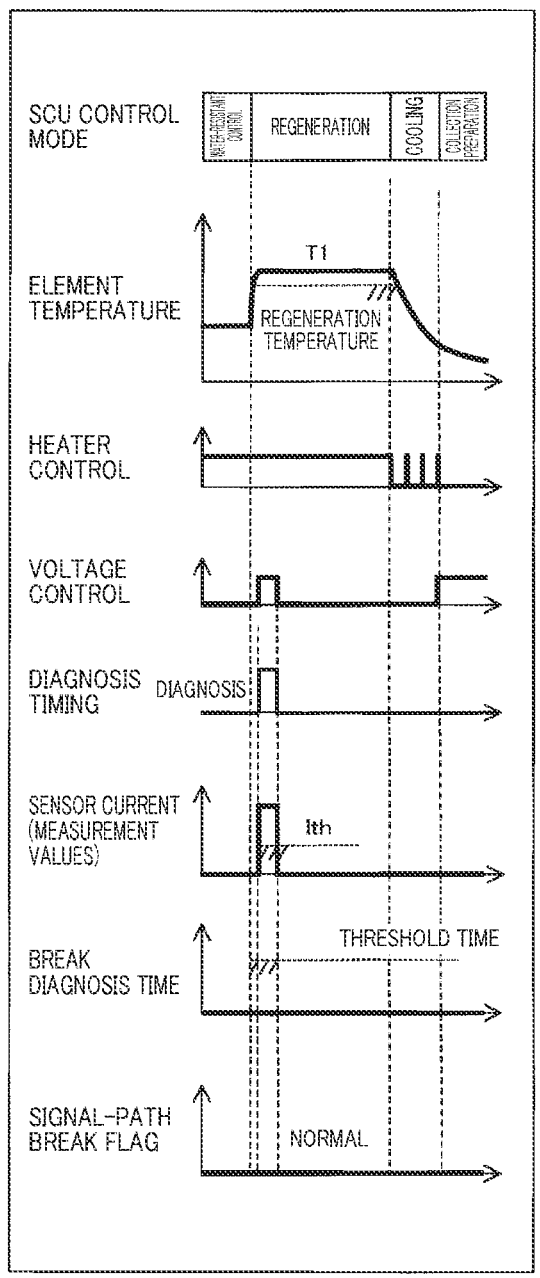
FIG. 12A is a timing chart illustrating the anomaly determination routine according to the first embodiment.
Figure 12B:
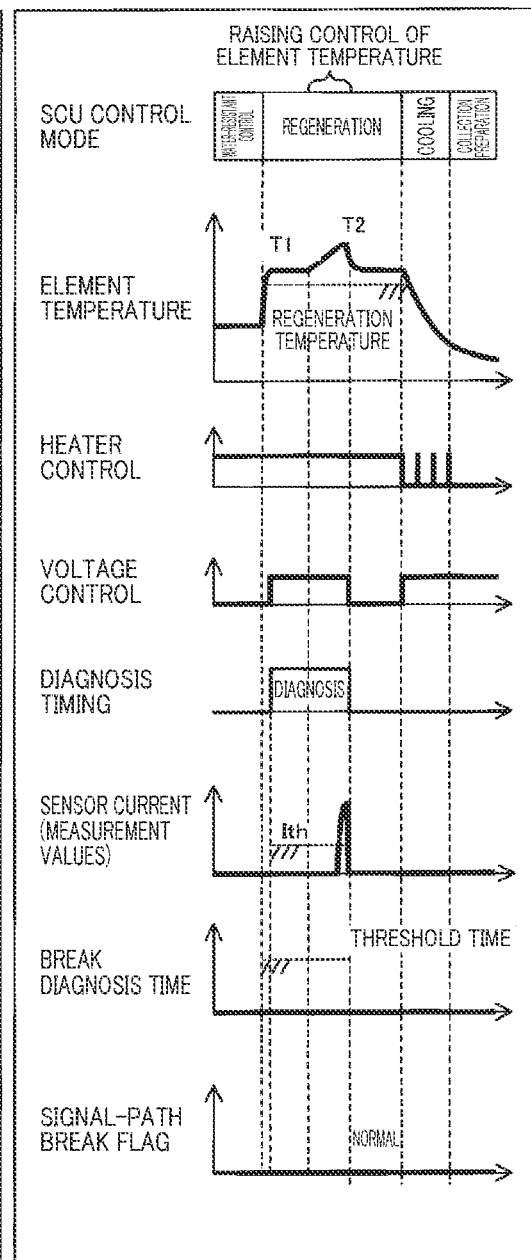
FIG. 12B is a timing chart illustrating the anomaly determination routine according to the first embodiment.
Figure 13:
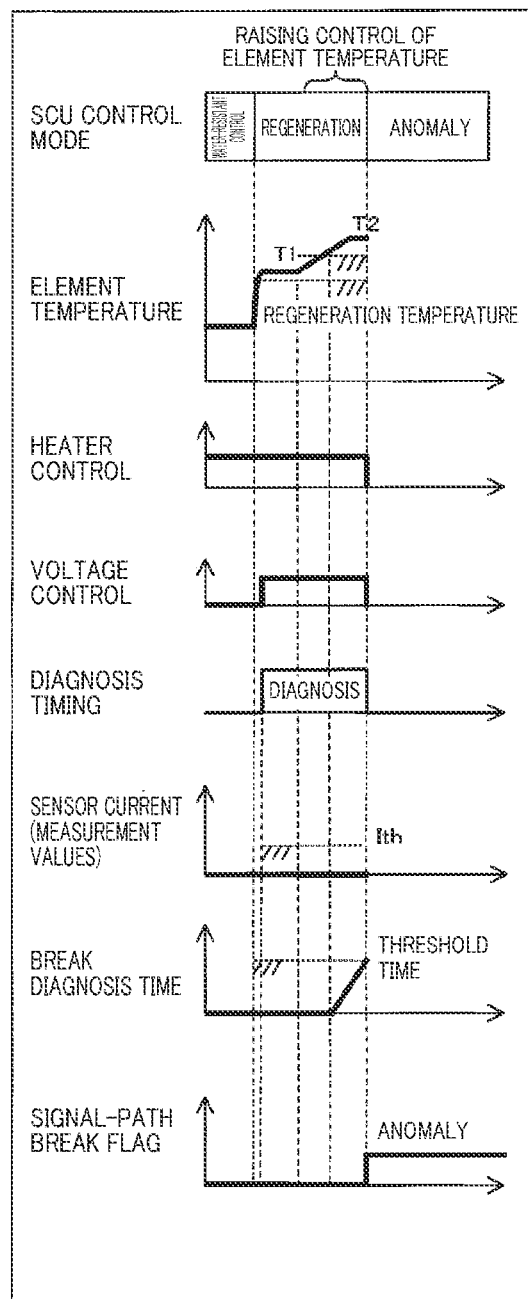
FIG. 13 is a timing chart illustrating the anomaly determination routine according to the first embodiment.

Next, the following schematically describes an anomaly determination routine carried out by the anomaly determiner 23 of the SCU 2 with reference to the flowchart of FIG. 11 and the timing charts included in FIGS. 12A, 12B, and 13. Specifically, the anomaly determiner 23 serves as the first determiner 24 to perform operations in steps S2 to S4, and serves as the second determiner 25 to perform operations in steps S6 to S10. As illustrated in FIGS. 12A and 12B, the SCU 2 includes a control mode for the sensor element 1, which include a water-resistant control mode, a regeneration mode, a cooling mode, and a collection preparation mode. That is, the control mode of the SCU 2 is sequentially shifted from the water-resistant control mode, regeneration mode, cooling mode, and collection preparation mode in response to startup of the engine ENG. First and second anomaly determination tasks of the respective first and second determiners 24 and 25 are carried out during the regeneration mode, and a regeneration temperature is set to be lower than or equal to the first determination temperature T1, and the first determination temperature T1 is set to be lower than the second determination temperature T2.

When starting the anomaly determination routine (see FIG. 11), the anomaly determiner 23 determines whether the control mode of the SCU 2 is set to the regeneration mode of the sensor element 1 in step S1.

Upon determination that the control mode of the SCU 2 is not set to the regeneration mode of the sensor element 1 (NO in step S1), the anomaly determiner 23 terminates the anomaly determination routine. Otherwise, upon determination that the control mode of the SCU 2 is set to the regeneration mode of the sensor element 1 (YES in step S1), the anomaly determiner 23 serves as the first determiner 23 to determine whether the element temperature T of the sensor element T is higher than or equal to the regeneration temperature, more specifically, higher than or equal to the first determination temperature T1 (see T≥T1?) in step S2.

Upon determination that the element temperature T of the sensor element T is lower than the first determination temperature T1 (NO in step S2), the anomaly determiner 23 returns to step S1. Otherwise, upon determination that the element temperature T of the sensor element T is higher than or equal to the first determination temperature T1 (YES in step S2), the anomaly determination routine proceeds to step S3.

In step S3, the anomaly determiner 23 serves as the first determiner 24 to instruct the measurement controller 22 to apply the predetermined measurement voltage between the measurement electrodes 31 and 32 of the measurement member 3 for the first anomaly determination task by the first determiner 24.

Next, the anomaly determiner 23 serves as the first determiner 24 to obtain the measurement signal from the measurement member 3, and determine whether a measurement value of the measurement signal is higher than or equal to the normal determination threshold Ith, which is expressed as MEASUREMENT VALUE≥Ith?, in step S4.

Upon determination that the measurement value of the measurement signal is higher than or equal to the normal determination threshold Ith (YES in step S4), the anomaly determiner 23 determines that no break faults have occurred in the signal path of the sensor element 1, so that the anomaly determination routine proceeds to step S5. In step S5, the anomaly determiner 23 determines that the signal path of the sensor element 1 is in proper working order, which is expressed as PROPER WORKING ORDER.

As illustrated in the timing chart illustrated in FIG. 12A, when the element temperature T becomes higher than or equal to the first determination temperature T1 after the control mode of the SCU 2 transitions from the water-resistant control mode to the regeneration mode, the measurement voltage is applied to the sensor element 1 in response to the timing, i.e., diagnosis timing, of the element temperature T becoming higher than or equal to the first determination temperature T1. For a normal fresh product of the sensor element 1, the sensor current flowing in the measurement member 3 becomes higher than or equal to the normal determination threshold Ith immediately, so that the sensor element 1 is determined to be in proper working order. This results in a signal-path break flag being maintained at an off level.

Otherwise, upon determination that the measurement value of the measurement signal is lower than the normal determination threshold Ith (NO in step S4), the anomaly determiner 23 serves as the second determiner 25 to perform the second anomaly determination task in step S6 and the subsequent steps.

Specifically, the anomaly determiner 23 serves as the second determiner 25 to instruct the temperature controller 21 to start the temperature rising of the element temperature T from the first determination temperature T1 to the second determination temperature T2 in step S6. Next, the anomaly determiner 23 serves as the second determiner 25 to obtain the measurement signal from the measurement member 3, and determine whether a measurement value of the measurement signal is higher than or equal to the normal determination threshold Ith, which is expressed as MEASUREMENT VALUE≥Ith? in step S7.

Upon determination that the measurement value of the measurement signal is higher than or equal to the normal determination threshold Ith (YES in step S7), the anomaly determiner 23 determines that no break faults have occurred in the signal path of the sensor element 1, so that the anomaly determination routine proceeds to step S5. In step S5, the anomaly determiner 23 determines that the signal path of the sensor element 1 is in proper working order, which is expressed as PROPER WORKING ORDER.

As illustrated in the timing chart illustrated in FIG. 12B, when the element temperature T becomes higher than or equal to the first determination temperature T1 after the control mode of the SCU 2 transitions from the water-resistant control mode to the regeneration mode, the measurement voltage is applied to the sensor element 1 in response to the diagnosis timing of the element temperature T becoming higher than or equal to the first determination temperature T1.

For a normal age-deteriorated product of the sensor element 1, no sensor current appears in the measurement member 3 at the voltage application timing. However, when the element temperature T has reached the second determination temperature T2, the sensor current becomes higher than or equal to the normal determination threshold Ith immediately, so that the sensor element 1 is determined to be in proper working order. This also results in the signal-path break flag being maintained at the off level.

Otherwise, upon determination that the measurement value of the measurement signal is lower than the normal determination threshold Ith (NO in step S7), the anomaly determination routine proceeds to step S8. In step S8, the anomaly determiner 23 serves as the second determiner 25 to determine whether the element temperature T has reached the second determination temperature T2 (see T≥T2?).

Upon determination that the element temperature T has reached the second determination temperature T2 (YES in step S8), the anomaly determination routine proceeds to step S9. In step S9, the anomaly determiner 23 starts measurement, i.e., counting, of a break diagnosis time, and thereafter determines whether the measured break diagnosis time becomes larger than or equal to a predetermined threshold time, which is expressed as BREAK DIAGNOSIS TIME-≥THRESHOLD TIME, in step S10.

Upon negative determination in step S8 or S10, the anomaly determiner 23 returns to the operation in step S1, and repeatedly performs the anomaly determination routine from the operation in step S1.

Otherwise, upon determination that the measured break diagnosis time is larger than or equal to the predetermined threshold time (YES in step S10), the anomaly determiner 23 determines that future measurement values do not become higher than or equal to the normal determination threshold Ith, thus determining that a break fault has occurred in the signal path of the sensor element 1 in step S11.

Then, the anomaly determiner 23 changes the control mode of the SCU 2 to an anomaly mode in step S12.

As illustrated in the timing chart of FIG. 13, when the element temperature T becomes higher than or equal to the first determination temperature T1 after the control mode of the SCU 2 transitions from the water-resistant control mode to the regeneration mode, the measurement voltage is applied to the sensor element 1 in response to the diagnosis timing of the element temperature T becoming higher than or equal to the first determination temperature T1. At that time, for an abnormal product of the sensor element 1, no sensor current appears in the measurement member 3 at the voltage application timing. Even when the element temperature T has reached the second determination temperature T2, the sensor current does not become higher than or equal to the normal determination threshold Ith.

The above operations are repeated until the measured break diagnosis time has reached the predetermined threshold time, so that the signal-path break flag is set to an on level.

As described above, the anomaly determiner 23, which is comprised of the first determiner 24 and the second determiner 25, makes it possible to determine whether the sensor signal lines have malfunctioned accurately while preventing overtemperature of the measurement member of the sensor element 1. The anomaly determiner 23 additionally makes it possible to utilize both the temperature controller 23 shared by the regeneration control of the measurement member 3 and the measurement controller 22 shared by the particulate matter measurement of the measurement member 3 to thereby perform the anomaly diagnosis of the sensor element 1 efficiently.

Figure 14:
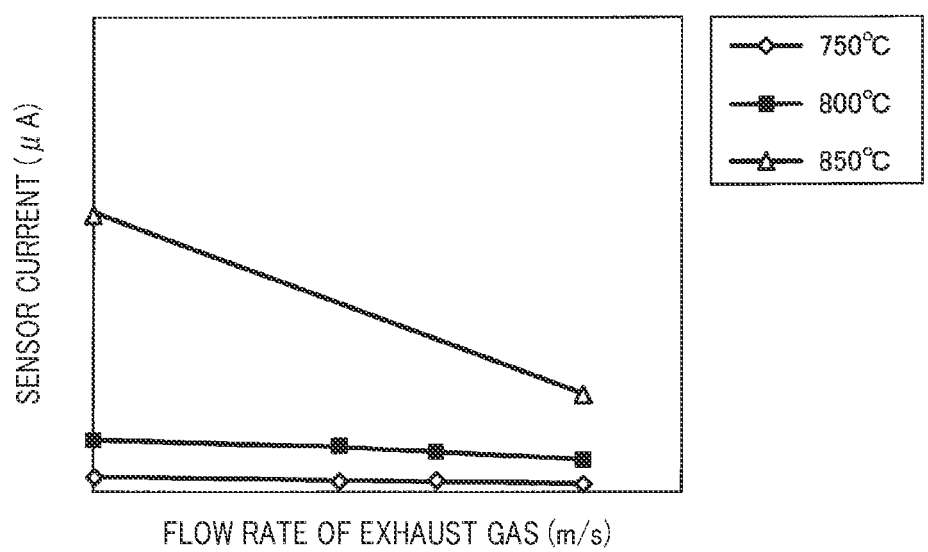
FIG. 14 is a graph illustrating a relationship between a sensor current measured by the sensor control unit and a flow rate of an exhaust gas according to the first embodiment.

As illustrated in FIG. 14, the sensor current changes depending on the flow rate of the exhaust gas. In particular, a high flow-rate of the exhaust gas at a high temperature condition, such as 850° C., over 800° C. results in the level of the sensor current significantly decreasing.

In contrast, even if the flow rate of the exhaust gas becomes high, there is a small change in the sensor current at a temperature range close to each of the first determination temperature T1 of, for example, 750° C., and second determination temperature T2 of, for example, 800° C., used by the anomaly determiner 23.

As described in the Background Art, Patent Literature 1, which uses an absolute sensor-current difference, may obtain an accurate absolute difference between first and second measurement values of the sensor current due to a significant change of the flow rate of the exhaust gas between corresponding first and second measurement timings.

In contrast, the first embodiment is configured such that each of the first and second determiners 24 and 25 individually performs determination of whether the sensor signal lines have malfunctioned based on a corresponding one of individual measurement values of the sensor current. This configuration therefore performs the anomaly diagnosis of the sensor element 1 with little influence from the flow rate of the exhaust gas.

There may be a response delay between (i) a rise in the element temperature T from the first determination temperature T1 to the second determination temperature T2 and (ii) a change in the sensor current. From this viewpoint, it is preferable to set an upper limit of the rate of rise in the element temperature T to, for example, a value lower than or equal to 3° C. per 0.1 seconds (3° C./0.1 seconds). It is also preferable to set a lower limit of the rate of rise in the element temperature T to, for example, a value higher than or equal to 1° C. per 0.1 seconds (1° C./0.1 seconds), which enables the element temperature T to rise from the first determination temperature T1 to the second determination temperature T2 within the predetermined threshold time.

Figure 15:
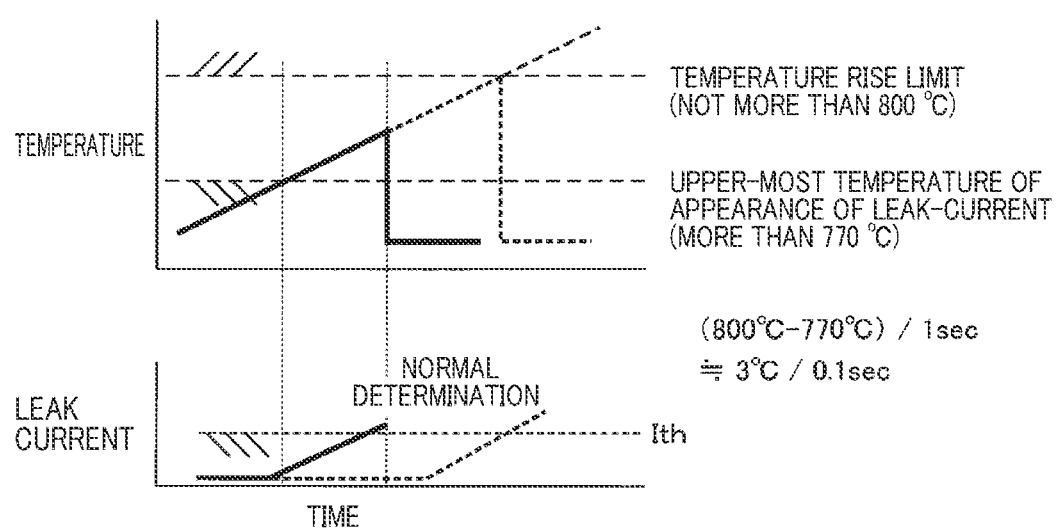
FIG. 15 is a timing chart illustrating (i) a relationship between the temperature rising task carried out through a temperature controller and the element temperature, and (ii) a relationship between the temperature rising task carried out through the temperature controller and a leak current according to the first embodiment.

For example, as illustrated in FIG. 15, let us consider a case where the second determination temperature T2 is set to an uppermost temperature, such as not less than 770° C., which enables the leak current to appear even for a normal minimum-current product, and is lower than or equal to the temperature rise limit, such as 800° C. In this case, a time delay of appearance and measurement of the leak current in response to the temperature rising of the sensor element 1 by the heater 4 may cause the element temperature T to exceed the uppermost temperature. In order to prevent the element temperature T from exceeding the uppermost temperature for such a case, it is necessary to restrict the temperature rise from the uppermost temperature to the temperature rise limit, such as the subtraction of 770° C. from 800° C., which is expressed as (800° C.−770° C.), within the time delay, such as 1 second. Specifically, setting the upper limit of the rate of rise in the element temperature T to 3° C./0.1 seconds in accordance the following formula prevents overtemperature of the measurement member of the sensor element 1:

$$(800°\ C.-770°\ C.)/1s = 3°\ C./0.1\ \text{seconds}$$

For the break diagnosis time, it is necessary to complete the rise in the element temperature T up to the second determination temperature T2 within the threshold time assuming, for example, that the threshold time is set to 10 seconds and the temperature difference is set to 100° C. For this reason, setting the lower limit of the rate of rise in the element temperature T to 100° C./10 seconds=1° C./0.1 seconds prevents erroneous diagnosis of the sensor element 1 due to the response delay in the element temperature T.

For the above reasons, it is preferable to set the rate of rise in the element temperature T to a value, such as 2° C./0.1 seconds, within the range from 1° C./0.1 seconds to 3° C./0.1 seconds inclusive.

Second Embodiment

The following describes a particulate matter sensor S according to the second embodiment with reference to FIGS. 16A to 21.

Figure 16A:
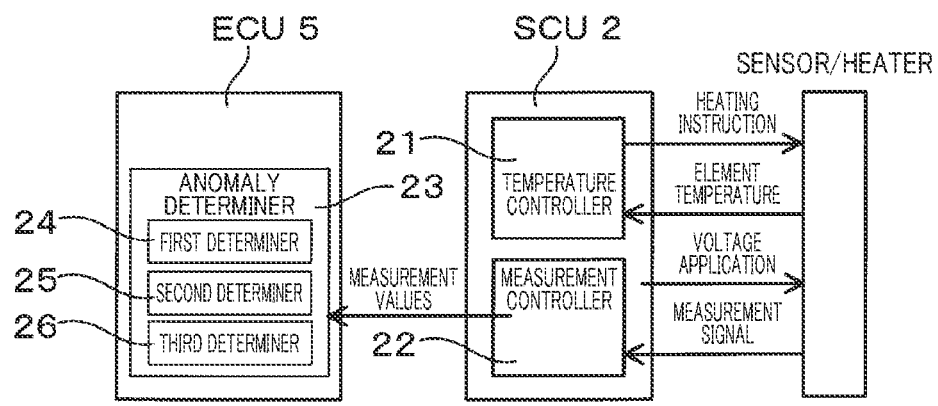
FIG. 16A is a block diagram schematically illustrating sensor control carried out by a sensor control unit of a particulate matter sensor according to the second embodiment.

A basic structure and basic operations of the particulate matter sensor S according to the second embodiment are identical to those of the particulate matter sensor S according to the first embodiment except that the anomaly determiner 23 of the SCU 2 includes a third determiner 26 (see FIG. 16A).

Figure 17:
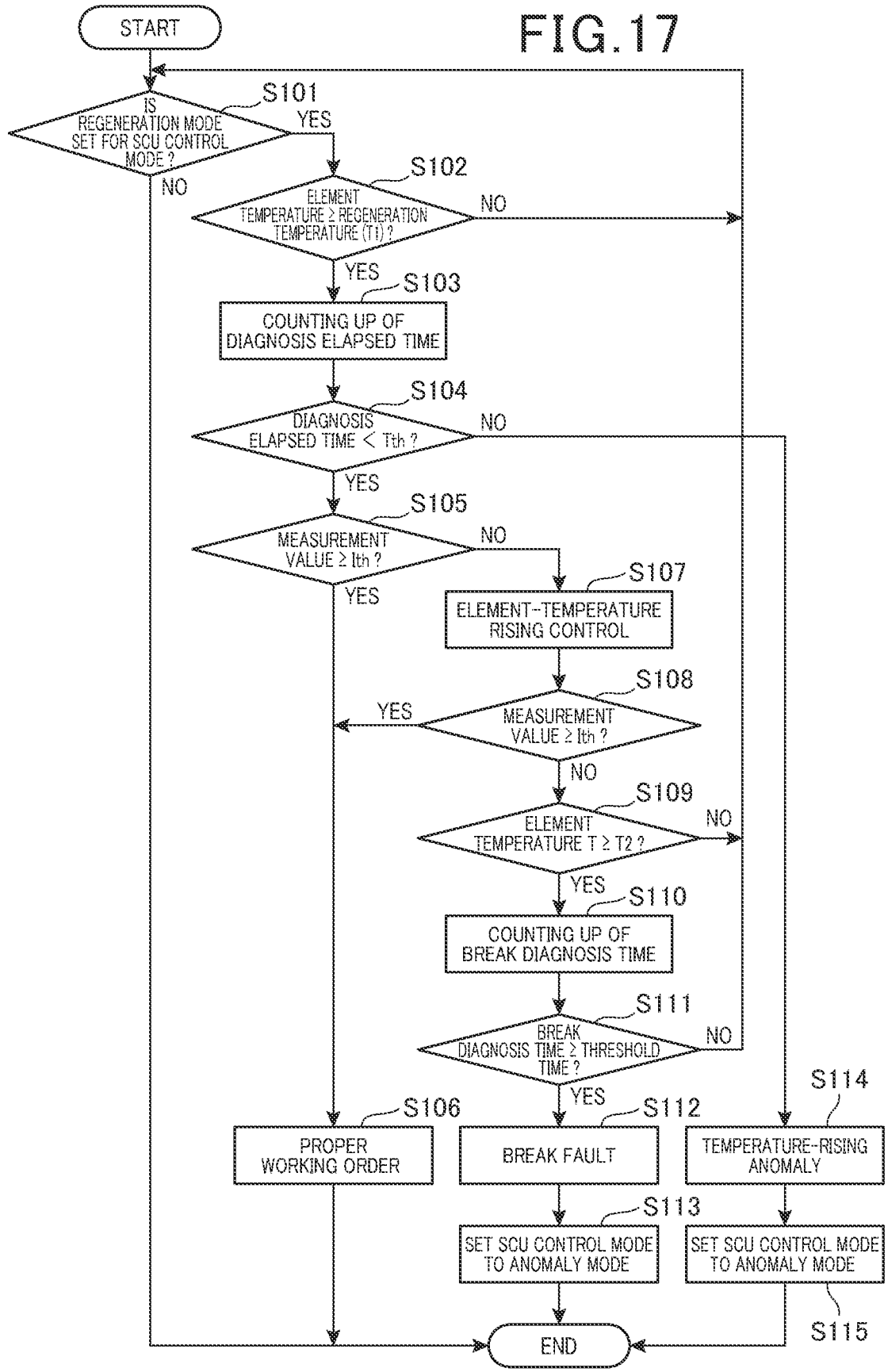
FIG. 17 is a flowchart illustrating an anomaly determination routine according to the second embodiment.

Next, the following schematically describes an anomaly determination routine carried out by the anomaly determiner 23 of the SCU 2 with reference to the flowchart of FIG. 17 and the timing charts included in FIG. 18.

Reference characters or numerals, which will be used later according to the second embodiment, include some reference characters or numerals that have been used in the first embodiment. Some elements of the second embodiment, to which the reference characters or numerals that have been used in the first embodiment are respectively attached, respectively represent, unless otherwise described, elements that are substantially identical to the corresponding elements described in the first embodiment.

As described above, the anomaly determiner 23 includes the third determiner 26 in addition the first and second determiners 24 and 25.

The third determiner 26 is configured to measure an elapsed time until the element temperature T has risen from the first determination temperature T1 to the second determination temperature T2, and determine whether the elapsed time, which will be referred to as a diagnosis elapsed time, is smaller than a time determination threshold Tth.

The anomaly determiner 23 is configured to determine that a temperature-rising anomaly of the measurement member 3 has occurred upon determination that determination of whether there is a signal-path anomaly has not carried out until the third determiner 26 determines that the diagnosis elapsed time is smaller than the time determination threshold Tth.

This enables the anomaly determiner 23 of the second embodiment to detect that there is temperature-rising anomaly of the measurement member 3 in addition to detecting a signal-path anomaly in the sensor element 1 described in the first embodiment.

As illustrated in FIG. 16A, the anomaly determiner 23 is installed in the ECU 5. The anomaly determiner 23 is configured such that the first determiner 24, second determiner 25, and third determiner 26 performs anomaly determination of the sensor element 1 based on the diagnosis elapsed time and measurement values sent from the measurement controller 22 in the SCU 2.

Figure 16B:
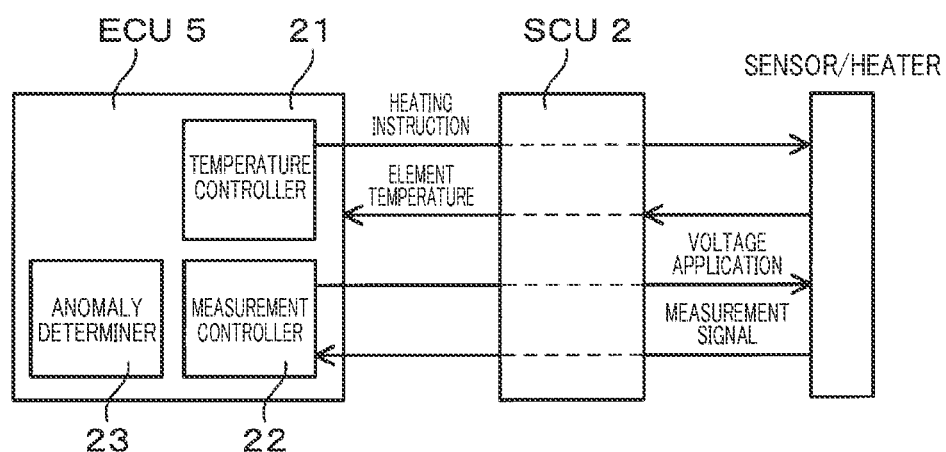
FIG. 16B is a block diagram schematically illustrating the sensor control carried out by the sensor control unit of the particulate matter sensor according to the second embodiment.

As illustrated in FIG. 16B, the temperature controller 21 and the measurement controller 22 can be installed in the ECU 5 in addition to the anomaly determiner 23. That is, each of the temperature controller 21, the measurement controller 22, and the anomaly determiner 23 can be installed in any of the SCU 2 and the ECU 5; these SCU 2 and ECU 5 serve as the sensor control unit S2.

Figure 19:
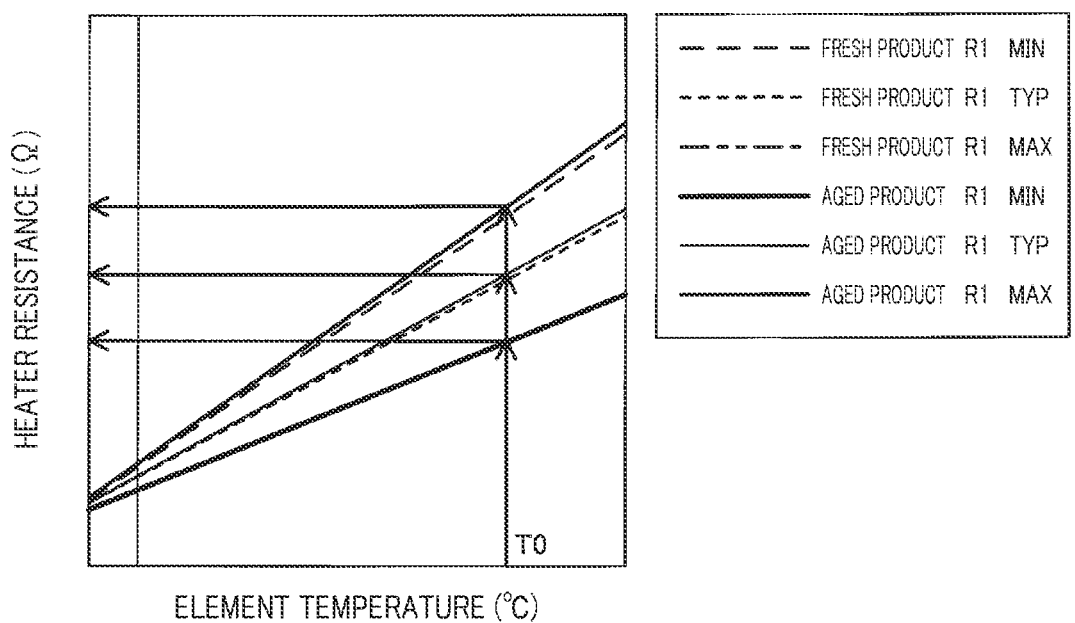
FIG. 19 is a graph illustrating a plurality of relationships, each is between a corresponding element temperature and a corresponding heater resistance for a corresponding one of products of the sensor element according to the second embodiment.
Figure 20:
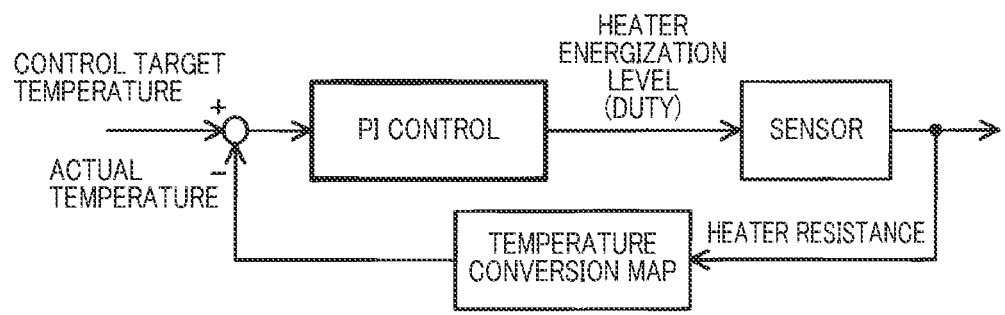
FIG. 20 is a block diagram illustrating a temperature control method carried out by the temperature controller according to the first embodiment.
Figure 21:
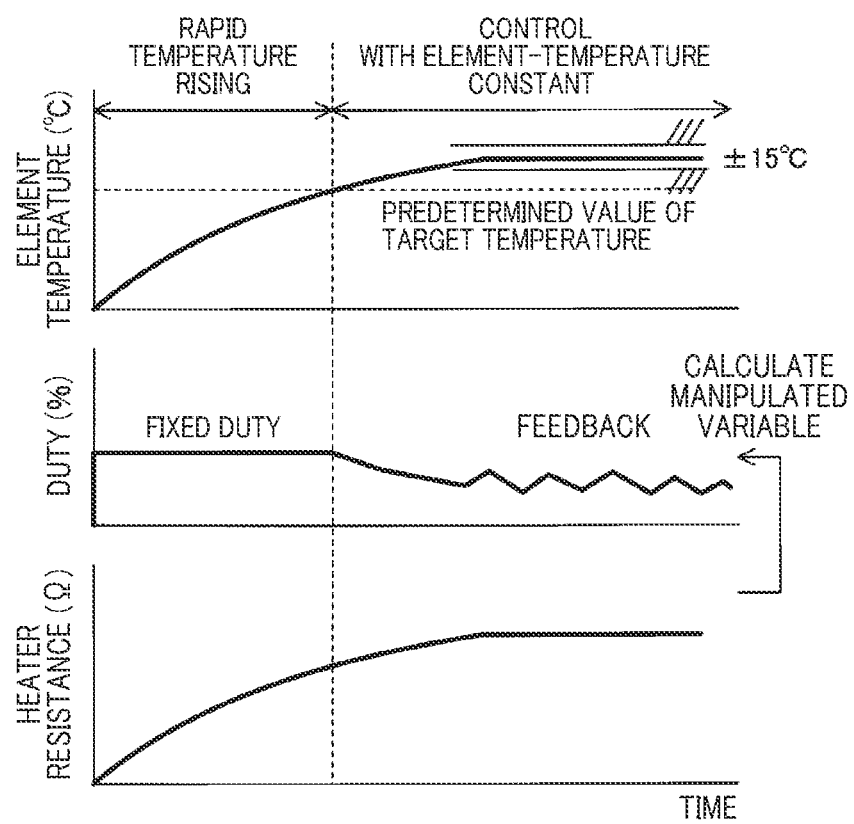
FIG. 21 is a timing chart illustrating the temperature control method carried out by the temperature controller according to the first embodiment.

As illustrated in FIGS. 19 to 21, the temperature controller 21 is configured to carry out a typical procedure of the temperature rise control of the element temperature T in accordance with a correlative relationship between the heater resistance and the element temperature T to thereby control energization of the heater 4.

Specifically, as illustrated in FIG. 19, individual products of the sensor element 1 have respective resistance-temperature characteristics different from one another due to individual variations in quality. For this reason, the temperature controller 21 stores therein a temperature conversion map representing the resistance-temperature characteristic of a selected one of fresh produces of the sensor element 1, and cyclically performs known PI control, which is illustrated in FIG. 20, to determine an energization level of the heater 4 to thereby adjust an absolute difference between an actual value of the element temperature T and a target temperature T0 to be reduced.

In particular, as illustrated in FIG. 21, the temperature controller 21 is configured to raise, based on a fixed value of the heater duty, the element temperature T rapidly up to a value adjacent to the target temperature T0 during a predetermined early stage of the temperature rising process. Thereafter, the temperature controller 21 is configured to cyclically (1) Calculate, based on a sampled value of the heater resistance, a value of the heater duty that causes the element temperature T to become a constant value (2) Perform feedback control based on the value of the heater duty as a manipulated variable for raising the element temperature T FIG. 19 shows that the resistance-temperature characteristics of aged products of the sensor element 1 have changed as compared with the resistance-temperature characteristics of fresh produces of the sensor element 1. This results in an actual value as the target temperature T0 based on the resistance-temperature characteristic of each aged produce of the sensor element 1 having a tendency of being lower than a designed value as the target temperature T0 based on the resistance-temperature characteristic of each fresh product of the sensor element 1.

For this reason, it may be difficult to accurately raise the element temperature T of the sensor element 1 to (i) the regeneration temperature during execution of the regeneration control, and (ii) each of the first and second determination temperatures T1 and T2.

From this viewpoint, the anomaly determiner is configured to determine that there is a temperature-rising anomaly of the measurement member 3 for such a situation to thereby disable execution of determination of whether there is a break fault in the signal pash of the sensor element 1.

Next, the following schematically describes an anomaly determination routine according to the second embodiment with reference to the flowchart of FIG. 17.

When starting the anomaly determination routine, the anomaly determiner 23 determines whether the control mode of the SCU 2 is set to the regeneration mode of the sensor element 1 in step S101.

Upon determination that the control mode of the SCU 2 is not set to the regeneration mode of the sensor element 1 (NO in step S101), the anomaly determiner 23 terminates the anomaly determination routine. Otherwise, upon determination that the control mode of the SCU 2 is set to the regeneration mode of the sensor element 1 (YES in step S101), the anomaly determiner 23 determines whether the element temperature T of the sensor element T is higher than or equal to the regeneration temperature, more specifically, higher than or equal to the first determination temperature T1 (see T≥T1?) in step S102.

Upon determination that the element temperature T of the sensor element T is lower than the first determination temperature T1 (NO in step S102), the anomaly determiner 23 returns to step S101. Otherwise, upon determination that the element temperature T of the sensor element T is higher than or equal to the first determination temperature T1 (YES in step S102), the anomaly determination routine proceeds to step S103.

In step S103, the anomaly determiner 23 serves as the third determiner 26 to start measurement, i.e., counting, of the diagnosis elapsed time, and subsequently the anomaly determiner 23 serves as the third determiner 26 to determine whether the diagnosis elapsed time is smaller than the time determination threshold Tth, which is expressed as DIAGNOSIS ELAPSED TIME<Tth? in step S104.

Upon determination that the diagnosis elapsed time is smaller than the time determination threshold Tth (YES in step S104), the anomaly determination routine proceeds to step S105. Then, the anomaly determiner 23 performs operations in steps S105 to S113 respectively corresponding to the operations in steps S4 to S12 of the first embodiment. The following therefore briefly describes the operations in steps S105 to S113.

In step S105, the anomaly determiner 23 determine whether a measurement value of the measurement signal is higher than or equal to the normal determination threshold Ith, which is expressed as MEASUREMENT VALUE≥Ith?.

Upon determination that the measurement value of the measurement signal is higher than or equal to the normal determination threshold Ith (YES in step S105), the anomaly determiner 23 determines that the signal path of the sensor element 1 is in proper working order, which is expressed as PROPER WORKING ORDER, in step S106.

Otherwise, upon determination that the measurement value of the measurement signal is lower than the normal determination threshold Ith (NO in step S105), the anomaly determiner 23 instructs the temperature controller 21 to start the temperature rising of the element temperature T from the first determination temperature T1 to the second determination temperature T2 in step S107. Next, the anomaly determiner 23 determines whether a measurement value of the measurement signal is higher than or equal to the normal determination threshold Ith, which is expressed as MEASUREMENT VALUE≥Ith? in step S108.

Upon determination that the measurement value of the measurement signal is higher than or equal to the normal determination threshold Ith (YES in step S108), the anomaly determiner 23 determines that the signal path of the sensor element 1 is in proper working order, which is expressed as PROPER WORKING ORDER, in step S106.

Otherwise, upon determination that the measurement value of the measurement signal is lower than the normal determination threshold Ith (NO in step S108), the anomaly determination routine proceeds to step S109. In step S109, the anomaly determiner 23 determines whether the element temperature T has reached the second determination temperature T2 (see T≥T2).

Upon determination that the element temperature T has reached the second determination temperature T2 (YES in step S109), the anomaly determination routine proceeds to step S110. In step S110, the anomaly determiner 23 starts measurement, i.e., counting, of the break diagnosis time, and thereafter determines whether the measured break diagnosis time becomes larger than or equal to the predetermined threshold time, which is expressed as BREAK DIAGNOSIS TIME≥THRESHOLD TIME, in step S111.

Upon negative determination in step S109 or S111, the anomaly determiner 23 returns to the operation in step S1, and repeatedly performs the anomaly determination routine from the operation in step S1.

Otherwise, upon determination that the measured break diagnosis time is larger than or equal to the predetermined threshold time (YES in step S111), the anomaly determiner 23 determines that a break fault has occurred in the signal path of the sensor element 1 in step S112. Then, the anomaly determiner 23 changes the control mode of the SCU 2 to the anomaly mode in step S113.

Figure 18A:
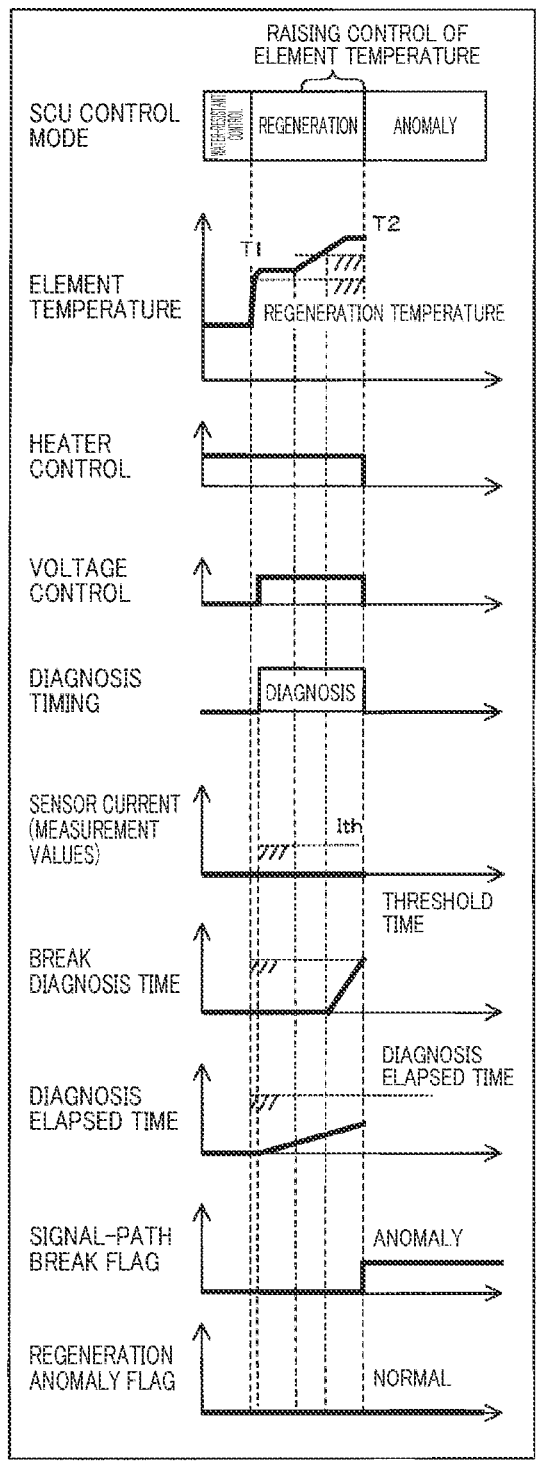
FIG. 18A is a timing chart illustrating the anomaly determination routine according to the second embodiment.

As illustrated in the timing chart of FIG. 18A, when the element temperature T becomes higher than or equal to the first determination temperature T1 after the control mode of the SCU 2 transitions from the water-resistant control mode to the regeneration mode, the measurement voltage is applied to the sensor element 1 in response to the diagnosis timing of the element temperature T becoming higher than or equal to the first determination temperature T1. At that time, if there is a break fault in the sensor element 1, no sensor current appears in the measurement member 3. Even when the element temperature T has reached the second determination temperature T2, the sensor current does not become higher than or equal to the normal determination threshold Ith. The above operations are repeated until the measured break diagnosis time has reached the predetermined threshold time, so that the signal-path break flag is set to the on level.

Additionally, when the element temperature T becomes higher than or equal to the first determination temperature T1, counting of the diagnosis elapsed time is started. If the sensor element 1 is determined to be in proper working order or not in proper working order until the diagnosis elapsed time reaches the predetermined threshold time Tth, the temperature rise control for the element temperature T is determined to be carried out normally, so that a temperature-rising anomaly flag is maintained at the off level.

Figure 18B:
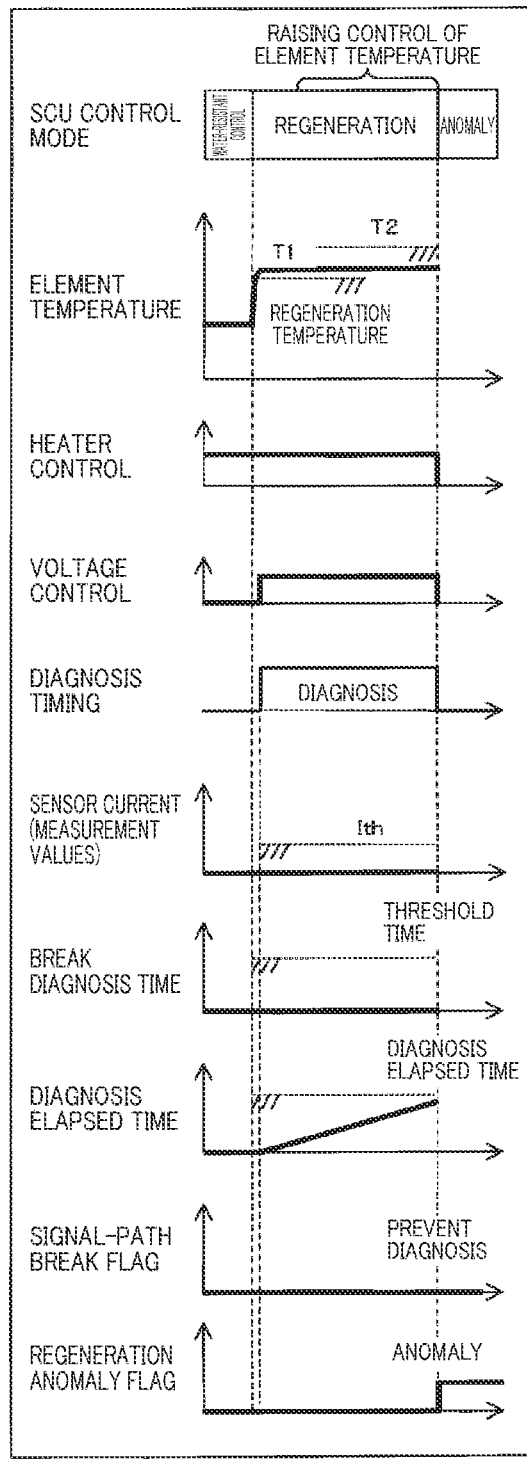
FIG. 18B is a timing chart illustrating the anomaly determination routine according to the second embodiment.

In contrast, as illustrated in the timing chart of FIG. 18B, if the sensor element 1 is not determined to be in proper working order or not in proper working order although the diagnosis elapsed time has reached the predetermined threshold time Tth, the temperature rise control for the element temperature T is determined not to be carried out normally. The time threshold Tth is set to be larger than or equal to a time that enable the element temperature T to sufficiently rise from the first determination time T1 to the second determination time T2 based on normal execution of the temperature rise control for the sensor element 1. When the diagnosis elapsed time has reached the time threshold Tth, the temperature-rising anomaly flag is set to be the on level.

That is, upon determination that the diagnosis elapsed time is larger than or equal to the time determination threshold Tth (NO in step S104), the anomaly determiner 23 determines that there is a temperature-rising anomaly of the measurement member 3 in step S114. Then, the anomaly determiner 23 changes the control mode of the SCU 2 to the anomaly mode in step S115.

As described above, the second embodiment makes it possible to determine whether there is a temperature-rising anomaly of the measurement member 3 in accordance with the diagnosis elapsed time. This configuration therefore makes it possible to, when predicting a decrease in the sensor current due to the occurrence of a temperature-rising anomaly of the measurement member 3, prevent determination of whether the signal path of the measurement signal of the sensor current is in proper working order, thus preventing erroneous diagnosis of the sensor element 1.

The present disclosure is not limited to the above first and second embodiments, and is freely modified as various embodiments within the scope of the subject matter of the present disclosure.

For example, the particulate matter sensor S according to each of the first and second embodiments is applied as a sensor for measuring particulate matter discharged from a vehicular engine, but the present disclosure is not limited thereto. The sensor element 1 is configured such that the measurement member 3 is mounted to the surface of the first end thereof, but can be mounted to a side of the sensor element 1. The structure and other features of each component constituting the particulate matter sensor S, such as the shape of the element cover 10 and the arrangement of the gas through-holes, can be freely modified.

What is claimed is:

1. A particulate matter sensor comprising:
   a sensor element for measuring particulate matter contained in a measurement gas; and
   a sensor control unit,
   the sensor element comprising:
      an insulating base having a surface;
      a measurement member that includes a pair of measurement electrodes located on the surface of the insulating base; and
      a heater for heating the measurement member,
   the sensor control unit comprising:
      a temperature controller configured to control energization of the heater to thereby maintain a temperature of the measurement member at a predetermined temperature;
      a measurement controller configured to apply a measurement voltage between the pair of measurement electrodes to thereby obtain a measurement signal based on a resistance value across the pair of measurement electrodes; and
      an anomaly determiner configured to perform an anomaly determination of whether there is an anomaly in the sensor element based on the measurement signal obtained by the measurement controller and sent from the measurement controller via a signal path, the anomaly determiner comprising:
a first determiner configured to:
instruct the temperature controller to control the temperature of the measurement member to be at a first determination temperature;
instruct the measurement controller to apply the measurement voltage between the measurement electrodes; and
determine whether a first measurement value of the measurement signal is higher than or equal to a predetermined normal determination threshold while the measurement voltage is applied between the measurement electrodes; and
a second determiner configured to:
instruct the temperature controller to control the temperature of the measurement member to be within a predetermined temperature range that is higher than the first determination temperature and lower than a second determination temperature;
instruct the measurement controller to apply the measurement voltage between the measurement electrodes; and
determine whether one or more second measurement values of the measurement signal are higher than or equal to the predetermined normal determination threshold while the measurement voltage is applied between the measurement electrodes;
the anomaly determiner being configured to perform, as the anomaly determination, a determination that there is a break fault in the signal path of the measurement signal in response to:
the first determiner determining that the first measurement value is lower than the predetermined normal determination threshold; and
the second determiner determining that the one or more second measurement values are lower than the predetermined normal determination threshold.

2. The particulate matter sensor according to claim 1, wherein:
the second determiner is configured to
obtain the one or more second measurement values from the measurement signal while the temperature of the measurement member is rising from the first determination temperature to the second determination temperature;
determine whether the one or more second measurement values are higher than or equal to the predetermined normal determination threshold; and
determine the break fault in the signal path in response to a continuous determination that the one or more second measurement values are each lower than the predetermined normal determination threshold.

3. The particulate matter sensor according to claim 1, wherein:
the anomaly determiner is configured to:
determine that the signal path is in proper working order in response to:
the first determiner determining that the first measurement value is higher than or equal to the predetermined normal determination threshold, or
the second determiner determining that at least one of the one or more second measurement values is higher than or equal to the predetermined normal determination threshold while the temperature of the measurement member is rising from the first determination temperature to the second determination temperature.

4. The particulate matter sensor according to claim 3, wherein:
the anomaly determiner is configured to terminate the anomaly determination without temperature rising of the sensor element from the first determination temperature to the second determination temperature being controlled by the temperature controller in response to the first determiner determining that the first measurement value is higher than or equal to the predetermined normal determination threshold.

5. The particulate matter sensor according to claim 1, wherein:
the temperature controller is configured to gradually raise the temperature of the measurement member from the first determination temperature to the second determination temperature.

6. The particulate matter sensor according to claim 1, wherein:
the temperature controller is configured to set a rate of rise in the temperature of the measurement member from the first determination temperature to the second determination temperature to not more than 3° C. per 0.1 seconds.

7. The particulate matter sensor according to claim 1, wherein:
the sensor control unit further comprises a regeneration control function of instructing the temperature controller to control the temperature of the measurement member within a predetermined regeneration temperature range that enables the particulate matter to be burned; and
the first determination temperature used by the first determiner is set to be within the predetermined regeneration temperature range.

8. The particulate matter sensor according to claim 1, wherein:
the second determination temperature used by the second determiner is set to a value, the value set for the second determination temperature enabling a lowest limit value of the measurement signal to be larger than or equal to the normal determination threshold, the lowest limit value of the measurement signal being estimated due to (i) an estimated individual variation range in quality of the measurement member, or (ii) an age-related deterioration in electric conductivity of the measurement member.

9. The particulate matter sensor according to claim 1, wherein:
the anomaly determiner further comprises:
a third determiner configured to:
measure an elapsed time until the temperature of the measurement member has risen from the first determination temperature to the second determination temperature; and
determine whether the elapsed time is smaller than a time determination threshold,
the anomaly determiner being configured to determine a temperature-rising anomaly of the measurement member in response to a determination that the anomaly determination of the anomaly in the sensor element has not been carried out while the third determiner determines that the elapsed time is smaller than the time determination threshold.

* * * * *